United States Patent
Edgar

(10) Patent No.: US 6,990,251 B2
(45) Date of Patent: Jan. 24, 2006

(54) METHOD, SYSTEM, AND SOFTWARE FOR SIGNAL PROCESSING USING SHEEP AND SHEPHERD ARTIFACTS

(75) Inventor: Albert D. Edgar, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 646 days.

(21) Appl. No.: 09/778,010

(22) Filed: Feb. 5, 2001

(65) Prior Publication Data

US 2001/0041019 A1 Nov. 15, 2001

Related U.S. Application Data

(60) Provisional application No. 60/180,035, filed on Feb. 3, 2000, provisional application No. 60/180,036, filed on Feb. 3, 2000.

(51) Int. Cl.
G06K 9/40 (2006.01)

(52) U.S. Cl. ............ 382/275; 382/260; 358/3.26; 358/463; 348/96

(58) Field of Classification Search ............ 382/252, 382/218, 219, 260, 263, 264, 274, 275, 278, 382/280, 294; 358/447, 448, 452, 453, 463, 358/3.26, 3.27, 520; 348/96, 97, 99, 102, 348/241
See application file for complete search history.

(56) References Cited

U.S. PATENT DOCUMENTS

| | | | |
|---|---|---|---|
| 2,404,138 A | 7/1946 | Mayer | 95/94 |
| 3,520,689 A | 7/1970 | Nagae et al. | 96/55 |
| 3,520,690 A | 7/1970 | Nagae et al. | 96/55 |
| 3,587,435 A | 6/1971 | Chioffe | 95/89 |
| 3,615,479 A | 10/1971 | Kohler et al. | 96/48 |
| 3,615,498 A | 10/1971 | Aral | 96/55 |
| 3,617,282 A | 11/1971 | Bard | 96/59 |

(Continued)

FOREIGN PATENT DOCUMENTS

EP 0 261 782 A2 8/1987

(Continued)

OTHER PUBLICATIONS

"Adaptive Fourier Threshold Filtering: A Method to Reduce Noise and Incoherent Artifacts in High Resolution Cardiac Images", Doyle, M., et al., 8306 Magnetic Resonance in Medicine 31, No. 5, Baltimore, MD, May, pp. 546-550, 1994.

(Continued)

Primary Examiner—Bhavesh M. Mehta
Assistant Examiner—Yosef Kassa
(74) Attorney, Agent, or Firm—Simon, Galasso and Frantz; David A. Novais

(57) ABSTRACT

A method, system, and software are disclosed for improving the quality of a signal. A signal is converted to a digital representation and then segregated into separate data sets based on one or more properties of the data sets. Data sets exhibiting relatively more information associated with a selected property are designated as shepherd artifacts, and data sets exhibiting relatively less information associated with a selected property are designated as sheep artifacts. A representative shepherd artifact is then used to guide a representative sheep artifact, resulting in a guided artifact with enhanced signal properties. This process may be repeated for other categories of signal properties. The resulting guided artifacts may then be combined to form a processed signal with one or more enhanced properties having increased quality. The present invention finds particular application in photography and digital film processing, whereby the illustrated method may be used to improve image quality.

30 Claims, 11 Drawing Sheets

U.S. PATENT DOCUMENTS

| | | |
|---|---|---|
| 3,747,120 A | 7/1973 | Stemme .................. 346/75 |
| 3,833,161 A | 9/1974 | Krumbein ................ 226/92 |
| 3,903,541 A | 9/1975 | Von Meister et al. ....... 354/317 |
| 3,946,398 A | 3/1976 | Kyser et al. ................ 346/1 |
| 3,959,048 A | 5/1976 | Stanfield et al. ............. 156/94 |
| 4,026,756 A | 5/1977 | Stanfield et al. ........... 156/554 |
| 4,081,577 A | 3/1978 | Horner ...................... 427/424 |
| 4,142,107 A | 2/1979 | Hatzakis et al. ............ 250/571 |
| 4,215,927 A | 8/1980 | Grant et al. ................ 354/317 |
| 4,249,985 A | 2/1981 | Stanfield ................... 156/554 |
| 4,265,545 A | 5/1981 | Slaker ....................... 356/431 |
| 4,301,469 A | 11/1981 | Modeen et al. ............. 358/75 |
| 4,490,729 A | 12/1984 | Clark et al. .................. 346/75 |
| 4,501,480 A | 2/1985 | Matsui et al. .............. 354/298 |
| 4,564,280 A | 1/1986 | Fukuda ..................... 354/317 |
| 4,594,598 A | 6/1986 | Iwagami .................... 346/140 |
| 4,621,037 A | 11/1986 | Kanda et al. ................ 430/30 |
| 4,623,236 A | 11/1986 | Stella ........................ 354/318 |
| 4,633,300 A | 12/1986 | Sakai ......................... 258/41 |
| 4,636,808 A | 1/1987 | Herron ...................... 346/75 |
| 4,666,307 A | 5/1987 | Matsumoto et al. ........ 356/404 |
| 4,670,779 A | 6/1987 | Nagano ...................... 358/75 |
| 4,736,221 A | 4/1988 | Shidara ...................... 354/317 |
| 4,741,621 A | 5/1988 | Taft et al. .................... 356/376 |
| 4,745,040 A | 5/1988 | Levine ........................ 430/21 |
| 4,755,844 A | 7/1988 | Tsuchiya et al. ............ 354/317 |
| 4,777,102 A | 10/1988 | Levine ........................ 430/21 |
| 4,796,061 A | 1/1989 | Ikeda et al. .................. 355/73 |
| 4,814,630 A | 3/1989 | Lim .......................... 250/578 |
| 4,821,114 A | 4/1989 | Gebhardt .................... 358/75 |
| 4,845,551 A | 7/1989 | Matsumoto ................. 358/80 |
| 4,851,311 A | 7/1989 | Millis et al. ................. 430/30 |
| 4,857,430 A | 8/1989 | Millis et al. ................. 430/30 |
| 4,875,067 A | 10/1989 | Kanzaki et al. ............. 354/325 |
| 4,969,045 A | 11/1990 | Haruki et al. ............... 358/228 |
| 4,991,007 A * | 2/1991 | Corley ....................... 348/188 |
| 4,994,918 A | 2/1991 | Lingemann ................. 358/214 |
| 5,027,146 A | 6/1991 | Manico et al. .............. 354/299 |
| 5,034,767 A | 7/1991 | Netz et al. .................. 354/317 |
| 5,101,286 A | 3/1992 | Patton ........................ 358/487 |
| 5,124,216 A | 6/1992 | Giapis et al. ................ 430/30 |
| 5,151,579 A * | 9/1992 | Maginness ................. 235/375 |
| 5,155,596 A | 10/1992 | Kurtz et al. ................. 358/214 |
| 5,196,285 A | 3/1993 | Thomson .................... 430/30 |
| 5,200,817 A | 4/1993 | Birnbaum ................... 358/80 |
| 5,212,512 A | 5/1993 | Shiota ........................ 354/319 |
| 5,231,439 A | 7/1993 | Takahashi et al. ........... 354/313 |
| 5,235,352 A | 8/1993 | Pies et al. ................... 346/140 |
| 5,255,408 A | 10/1993 | Blackman ................... 15/308 |
| 5,266,805 A | 11/1993 | Edgar ........................ 250/330 |
| 5,267,030 A | 11/1993 | Giorgianni et al. .......... 358/527 |
| 5,292,605 A | 3/1994 | Thomson .................... 430/30 |
| 5,296,923 A | 3/1994 | Hung ......................... 358/527 |
| 5,334,247 A | 8/1994 | Columbus et al. .......... 118/411 |
| 5,350,651 A | 9/1994 | Evans et al. ................. 430/21 |
| 5,350,664 A | 9/1994 | Simons ...................... 430/362 |
| 5,357,307 A | 10/1994 | Glanville et al. ........... 354/324 |
| 5,360,701 A | 11/1994 | Elton et al. ................. 430/501 |
| 5,371,542 A | 12/1994 | Pauli et al. .................. 348/262 |
| 5,391,443 A | 2/1995 | Simons et al. ............... 430/21 |
| 5,414,779 A | 5/1995 | Mitch ......................... 382/199 |
| 5,416,550 A | 5/1995 | Skye et al. .................. 354/298 |
| 5,418,119 A | 5/1995 | Simons ...................... 430/507 |
| 5,418,597 A | 5/1995 | Lahcanski et al. ........... 355/76 |
| 5,432,579 A | 7/1995 | Tokuda ...................... 354/293 |
| 5,436,738 A | 7/1995 | Manico ...................... 358/503 |
| 5,440,365 A | 8/1995 | Gates et al. ................. 354/298 |
| 5,447,811 A | 9/1995 | Buhr et al. .................. 430/20 |
| 5,448,380 A | 9/1995 | Park .......................... 358/520 |
| 5,452,018 A | 9/1995 | Capitant et al. ............. 348/651 |
| 5,465,155 A | 11/1995 | Edgar ........................ 358/500 |
| 5,475,423 A * | 12/1995 | Eiberger ..................... 348/97 |
| 5,477,345 A | 12/1995 | Tse ........................... 358/500 |
| 5,496,669 A | 3/1996 | Pforr et al. .................. 430/22 |
| 5,516,608 A | 5/1996 | Hobbs et al. ................ 430/30 |
| 5,519,510 A | 5/1996 | Edgar ........................ 358/471 |
| 5,533,086 A * | 7/1996 | Crins et al. ................. 378/98.2 |
| 5,546,477 A | 8/1996 | Knowles et al. ............ 382/242 |
| 5,550,566 A | 8/1996 | Hodgson et al. ............ 345/202 |
| 5,552,904 A | 9/1996 | Ryoo et al. ................. 358/518 |
| 5,563,717 A | 10/1996 | Koeng et al. ............... 358/406 |
| 5,568,270 A | 10/1996 | Endo ......................... 358/298 |
| 5,576,836 A | 11/1996 | Sano et al. .................. 358/302 |
| 5,581,376 A | 12/1996 | Harrington ................. 358/518 |
| 5,587,752 A | 12/1996 | Petruchik ................... 396/315 |
| 5,592,571 A * | 1/1997 | Peters ........................ 382/261 |
| 5,596,415 A | 1/1997 | Cosgrove et al. ........... 358/296 |
| 5,627,016 A | 5/1997 | Manico ...................... 430/434 |
| 5,641,596 A * | 6/1997 | Gray et al. .................. 430/21 |
| 5,649,260 A | 7/1997 | Wheeler et al. ............. 396/569 |
| 5,664,253 A | 9/1997 | Meyers ...................... 396/603 |
| 5,664,255 A | 9/1997 | Wen .......................... 396/627 |
| 5,667,944 A | 9/1997 | Reem et al. ................. 430/359 |
| 5,678,116 A | 10/1997 | Sugimoto et al. ........... 396/611 |
| 5,691,118 A | 11/1997 | Haye ......................... 430/357 |
| 5,695,914 A | 12/1997 | Simon et al. ............... 430/379 |
| 5,698,382 A | 12/1997 | Nakahanada et al. ........ 430/418 |
| 5,726,773 A | 3/1998 | Mehlo et al. ............... 358/474 |
| 5,739,897 A | 4/1998 | Frick et al. ................. 355/40 |
| 5,771,107 A | 6/1998 | Fujimoto et al. ............ 358/464 |
| 5,790,277 A | 8/1998 | Edgar ........................ 358/487 |
| 5,835,795 A | 11/1998 | Craig et al. ................. 396/6 |
| 5,835,811 A | 11/1998 | Tsumura ..................... 396/598 |
| 5,870,172 A | 2/1999 | Blume ........................ 355/27 |
| 5,880,819 A | 3/1999 | Tanaka et al. ............... 355/75 |
| 5,892,595 A | 4/1999 | Yamakawa et al. ......... 358/530 |
| 5,930,388 A | 7/1999 | Murakami et al. .......... 382/167 |
| 5,959,720 A | 9/1999 | Kwon et al. ................ 355/38 |
| 5,963,662 A | 10/1999 | Vachtsevanos et al. ..... 382/150 |
| 5,966,465 A | 10/1999 | Keith et al. ................. 382/232 |
| 5,979,011 A | 11/1999 | Miyawaki et al. ........... 15/308 |
| 5,982,936 A | 11/1999 | Tucker et al. ............... 382/233 |
| 5,982,937 A | 11/1999 | Accad ....................... 382/239 |
| 5,982,941 A * | 11/1999 | Loveridge et al. .......... 382/260 |
| 5,982,951 A | 11/1999 | Katayama et al. .......... 382/284 |
| 5,988,896 A | 11/1999 | Edgar ........................ 396/604 |
| 5,991,444 A | 11/1999 | Burt et al. ................... 382/232 |
| 5,998,109 A | 12/1999 | Hirabayashi ................ 430/434 |
| 6,000,284 A | 12/1999 | Shin et al. .................. 73/150 |
| 6,005,987 A | 12/1999 | Nakamura et al. .......... 382/294 |
| 6,061,100 A * | 5/2000 | Ward et al. ................. 348/607 |
| 6,065,824 A | 5/2000 | Bullock et al. ............. 347/19 |
| 6,069,714 A | 5/2000 | Edgar ........................ 358/487 |
| 6,088,084 A | 7/2000 | Nishio ....................... 355/75 |
| 6,089,687 A | 7/2000 | Helterline ................... 347/7 |
| 6,101,273 A * | 8/2000 | Matama ..................... 382/169 |
| 6,102,508 A | 8/2000 | Cowger ..................... 347/7 |
| 6,130,741 A * | 10/2000 | Wen et al. .................. 355/40 |
| 6,137,965 A | 10/2000 | Burgeios et al. ............ 396/626 |
| 6,200,738 B1 | 3/2001 | Takano et al. .............. 430/362 |
| 6,296,994 B1 * | 10/2001 | Sowinski et al. ........... 430/505 |
| 6,319,465 B1 * | 11/2001 | Schnell et al. .............. 422/44 |
| 6,728,402 B2 * | 4/2004 | Ruggiero et al. ........... 382/168 |

FOREIGN PATENT DOCUMENTS

| | | |
|---|---|---|
| EP | 0 422 220 A1 | 3/1989 |
| EP | 0 482 790 B1 | 9/1991 |
| EP | 0 525 886 A3 | 7/1992 |
| EP | 0 580 293 A1 | 1/1994 |
| EP | 0 601 364 A1 | 6/1994 |
| EP | 0 669 753 A2 | 2/1995 |
| EP | 0 794 454 A2 | 2/1997 |
| EP | 0 768 571 A2 | 4/1997 |

| | | |
|---|---|---|
| EP | 0 806 861 A1 | 11/1997 |
| EP | 0 878 777 A2 | 11/1998 |
| EP | 0 930 498 A2 | 12/1998 |
| WO | WO 90/01240 | 2/1990 |
| WO | WO 91/09493 | 6/1991 |
| WO | WO 97/25652 | 7/1997 |
| WO | WO 98/19216 | 5/1998 |
| WO | WO 98/25399 | 6/1998 |
| WO | WO 98/31142 | 7/1998 |
| WO | WO 98/34157 | 8/1998 |
| WO | WO 98/34397 | 8/1998 |
| WO | WO 99/43148 | 8/1999 |
| WO | WO 99/43149 | 8/1999 |
| WO | WO 01/01197 | 1/2001 |
| WO | WO 01/13174 A1 | 2/2001 |
| WO | WO 01/45042 A1 | 6/2001 |
| WO | WO 01/50192 A1 | 7/2001 |
| WO | WO 01/50193 A1 | 7/2001 |
| WO | WO 01/50194 A1 | 7/2001 |
| WO | WO 01/50197 A1 | 7/2001 |
| WO | WO 01/52556 A2 | 7/2001 |

OTHER PUBLICATIONS

"*Anisotropic Spectral Magnitude Estimation Filters for Noise Reduction and Image Enhancement*", Aich, T., et al., Philips GmbH Research Laboratories, IEEE, pp. 335-338, 1996.

"*Adaptive-neighborhood filtering of images corrupted by signal-dependent noise*", Rangayyan, R., et al., Applied Optics, vol. 37, No. 20, pp. 4477-4487, Jul. 10, 1998.

"*Grayscale Characteristics*", The Nature of Color Images, Photographic Negatives, pp. 163-168.

"*Parallel Production of Oligonucleotide Arrays Using Membranes and Reagent Jet Printing*", Stimpson, D., et al., Research Reports, BioTechniques, vol. 25, No. 5, pp. 886-890, 1998.

"*Low-Cost Display Assembly and Interconnect Using Ink-Jet Printing Technology*", Hayes, D. et al., Display Works '99, MicroFab Technologies, Inc., pp. 1-4, 1999.

"*Ink-Jet Based Fluid Microdispensing in Biochemical Applications*", Wallace, D., MicroFab Technologies, Inc., Laboratory Automation News, vol. 1, No. 5, pp. 6-9, Nov., 1996.

"*Protorealistic Ink-Jet Printing Through Dynamic Spot Size Control*", Wallace, D., Journal of Imaging Science and Technology, vol. 40, No. 5, pp. 390-395, Sept/Oct. 1996.

"*MicroJet Printing of Solder and Polymers for Multi-Chip Modules and Chip-Scale Package*", Hayes, D., et al., MicroFab Technologies, Inc.

"*A Method of Characterisstics Model of a Drop-on-Demand Ink-Jet Device Using an Integral Method Drop Formation Model*", Wallace, D., MicroFab Technologies, Inc., The American Society of Mechanical Engineers, Winter Annual Meeting, pp. 1-9, Dec. 10-15, 1989.

"*Digital Imaging Equipment White Papers*", Putting Damaged Film on ICE, www.nikonusa.com/reference/whitepapers/imaging, Nikon Corporation, Nov. 28, 2000.

\* cited by examiner

METHOD, SYSTEM, AND SOFTWARE FOR SIGNAL PROCESSING USING SHEEP AND SHEPHERD ARTIFACTS

CROSS REFERENCE TO RELATED APPLICATIONS

This application claims the benefit of U.S. Patent Application Ser. Nos. 60/180,036 and 60/180,035 filed Feb. 3, 2000 entitled "Signal Processing with Sheep and Shepherd Artifacts," of common assignee herewith.

This application is related to U.S. Patent Application Nos. 60/180,036, entitled "Match Blur System and Method"; 60/180,030, entitled "Reducing Streaks in Scanning"; and Ser. No. 09/777,394, entitled "Pyramiding and Digital Imaging System and Method", each of the same inventor hereof and those respective applications are incorporated herein. This application is also related to U.S. patent application Ser. No. 09/255,401 entitled "Parametric Image Stitching", filed on Feb. 22, 1999, and Ser. No. 09/247,264 entitled "Image Block Windowed Blending", filed on Feb. 10, 1999, each of the same inventor hereof and incorporated herein. This application is also related to U.S. Patent Application No. 60/180,028, entitled "Method to Remove Magenta Stain From Digital Images", assigned to the same assignee hereof and incorporated herein.

FIELD OF THE INVENTION

The present invention relates generally to signal processing and more particularly to using portions of a signal to enhance the remainder of the signal.

BACKGROUND OF THE INVENTION

A frequent goal of signal processing is to improve the quality, or the fidelity, of a captured signal to the information it represents. For example, recorded audio signals are often processed to remove noise and undesirable signal components to create an audio signal much more similar to the original sound that was recorded. However, conventional techniques used to enhance a signal result in a tradeoff between two or more desired properties of a signal; if property A is enhanced during the processing of a signal, property B will degrade in quality as a result of the enhancement of property A.

This type of tradeoff is often encountered in digital imaging applications, such as photographic film digitization, when the enhancement of the two desirable image properties, such as color and definition, inversely affect each other. When the color property is maximized or enhanced, the definition of lines, boundaries, edges, and detail is reduced, similarly, when detail is maximized or enhanced, the color properties of the image degrade.

Given the tradeoffs required by current signal processing methods, it is clear that conventional methods are less than perfect.

SUMMARY OF THE INVENTION

Therefore, what is needed is a method for enhancing signal quality for at least one desired signal property without significantly degrading other desired signal properties. Accordingly, the present invention provides a method comprising obtaining a first set of information representing an artifact to a first degree of quality, and obtaining a second set of information representing the same artifact to a second degree of quality. The method also comprises determining which set of information represents the artifact to a higher degree of quality and altering the set of information representing the artifact to a lesser degree of quality, based on the set of information representing the artifact to a higher degree of quality.

In another embodiment of the present invention, a digital film development system is provided. The digital film development system comprises a film processing system and a data processing system. The film processing system includes an image capturing station capable of obtaining sets of data representing an image formed in film. The data processing system includes: a processor; memory operably coupled to the processor; and a program of instructions capable of being stored in the memory and executed by the processor. The program of instructions includes instructions for obtaining a first set of information representing an artifact to a first degree of quality and obtaining a second set of information representing the artifact to a second degree of quality. The program of instructions also includes instructions for determining which set of information represents the artifact to a higher degree of quality and altering the set of information representing the artifact to a lesser degree of quality, based on the set of information representing the artifact to a higher degree of quality.

In an additional embodiment of the present invention, a digital image tangibly embodied in a computer readable medium is provided. The digital image is generated according to a method comprising obtaining a first set of information representing an artifact to a first degree of quality and obtaining a second set of information representing the artifact to a second degree of quality. The method further comprises determining which set of information represents the artifact to a higher degree of quality and altering the set of information representing the artifact to a lesser degree of quality, based on the set of information representing the artifact to a higher degree of quality.

In yet another embodiment of the present invention, a method is provided comprising illuminating an image and recording at least one digital representation of the image, selecting, from the at least one digital representation, a first set of information representing a portion of the image and a second set of information representing the portion of the image. The method additionally comprises generating, from one of the sets of information, a shepherd artifact representing an image artifact with a higher degree of quality and generating from the other set of information, a sheep artifact representing the image artifact with a lesser degree of quality. The method then alters the sheep artifact, using the shepherd artifact, to improve the degree of quality with which the sheep artifact represents the image artifact.

An advantage of at least one embodiment of the present invention is that signal quality is enhanced for a desired property without degrading a different desired property.

Another advantage of at least one embodiment of the present invention is that calculations to improve signal quality can be performed relatively quickly, due to a lower processing overhead and less user intervention than conventional methods.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF AN EMBODIMENT OF THE INVENTION

FIGS. 1–18 illustrate a method and a system for enhancing an original signal. As subsequently discussed in greater detail, two or more sets of signal data are determined from the original signal, one set having relatively more information associated with a selected property (shepherd artifacts), and one set having relatively less information associated with the selected property (sheep artifacts). A representative shepherd artifact is chosen from a plurality of shepherd artifacts and a representative sheep artifacts is chosen from a plurality of sheep artifacts. The representative shepherd artifact is then used to guide (alter) the representative sheep artifact, resulting in a guided artifact with enhanced signal properties. This process may be repeated for each selected category of properties of the signal data. The resulting guided artifacts may then be combined to form a processed signal with one or more enhanced properties having increased quality.

Figure 1:
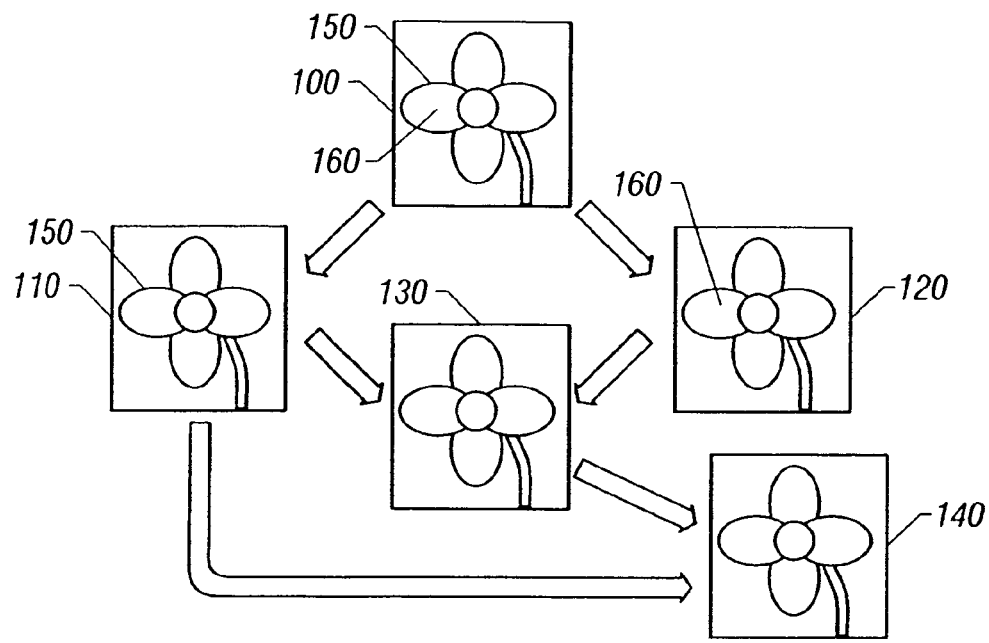
FIG. 1 is a pictorial diagram demonstrating a method of using sheep and shepherd artifacts according to at least one embodiment of the present invention.

Referring now to FIG. 1, an illustration demonstrating a method of using sheep and shepherd artifacts to enhance an image is discussed according to at least one embodiment of the present invention. Image 100 is a visual representation of a data set resulting from the capture of a signal (the image). For example, image 100 may represent an image captured in photographic film, on X-ray film, one or more frames of a video film, an infrared image captured by a satellite, etc. The term "signal," as used herein, can refer to a captured or recorded representation of an environmental phenomenon, such as one or more images captured on film, a recorded audio signal recorded on magnetic media, and the like. Although various types of signals may be processed according to the present invention, the processing of a data representative of an image captured on photographic film will be discussed for clarity and ease of discussion. It will be appreciated that the methods illustrated herein may also be applied to other types of signals and their representative forms, such as processing an audio signal to produce an enhanced audio signal with improved fidelity.

In at least one embodiment, image 100 includes one or more shepherd artifacts 110 and one or more sheep artifacts 120. Shepherd artifact 110, as depicted in FIG. 1, includes edge 150, whereas sheep artifact 160 includes color information 160. In most cases, shepherd artifact 110 will have less noise than sheep artifact 120 for a certain same characteristic. In embodiments where the signal to be processed is an image, shepherd artifacts 110 generally have the property of strong definition of boundary parameters or strong demarcation, such as lines and edges (edge 150), while sheep artifacts 120 generally have the property of a variation within the boundary parameter, such as color (color information 160), tones, and hues.

Although the term "artifact" is often used in other circumstances to refer to an undesirable phenomenon or unwanted result, the term "artifact," as used herein, refers to the representation of a property, attribute, or characteristic of a signal. Properties, attributes, and or characteristics represented by artifacts can include, but are not limited to, the magnitude or phase of a signal, a color information represented in a layer of film, the edges or detail in an image, a representation of a signal at a given point in time, and the like. Analogous to the shepherd guiding his flock, in at least one embodiment of the present invention, a less noisy artifact is used to guide a more noisy artifact. The term "shepherd artifact," as used herein, refers to an artifact exhibiting one or more particular properties and having more information, or information of a higher quality, for the one or more properties than other artifacts exhibiting the same one or more properties.

Likewise, the term "sheep artifact," as used herein, refers to an artifact exhibiting one or more particular properties and exhibiting less information, or information of a lesser quality, for a certain one or more properties than other artifacts exhibiting the same one or more properties, and the guided property of the sheep artifact correlates to, but can be different from, the guide property of the shepherd artifact.

The capture and processing of signals often results in unwanted information manifesting itself in the captured signal. For example, "noise", in a variety of forms, often appears in captured signals and their digital representations. Noise can often refer to a disturbance that obscures or reduces the clarity of a signal, such as white noise introduced by transmission of a signal. Noise, as used herein, can also refer to any property, characteristic, attribute, and the like, that may interfere with the capture, processing, and or representation of another desired attribute. For example, noise could refer to blurred edges, where a sharp edge is considered a desirable attribute, or green information in a red color channel.

A method of using shepherd artifacts to guide sheep artifacts to improve image quality can be illustrated by way of example. In this example, image 100 contains noise, such as "white" noise introduced by the digitization of the image from photographic film. Since shepherd artifact 110 contains edge 150, which generally has less noise than color information 160 in sheep artifact 120, shepherd artifact 110 may guide sheep artifact 120 to reduce noise associated with color information 160. In another example, sheep artifact 120 could exhibit relatively good color information (color information 160) but lack detail, whereas shepherd artifact 110 exhibits great detail. Shepherd artifact 110 could then guide sheep artifact 120 to increase detail in sheep artifact 120, resulting in guided artifact 130 with good color information and enhanced detail.

A number of methods may be used to guide sheep artifact 120 using shepherd artifact 110. For example, in one embodiment, blurring is used to eliminate noise. Blurring may be used to "average" out the characteristics, such as color, of one or more pixels in a selected region. However, blurring regions of sharp contrast, such as edges or areas of sharp contrast, often results in unacceptable degradation of the edges. Edge 150 of shepherd artifact 110 may be used, in one embodiment, to determine the location of edges of color information 160 in sheep artifact 120. Regions away from edge 150 may be blurred to a greater extent than those near or adjacent to edge 150. By using shepherd 110 to guide sheep 120 in the blurring process, noise can be removed from color information 160, resulting in guided artifact 130. In this example, some or all of the information contained in shepherd artifact 110 may be combined with guided artifact 130 to produce enhanced image 140 containing less noise than image 100 without a loss in the sharpness of the edges (edge 150) contained in the image 100. Various methods of guiding sheep artifacts using shepherd artifacts according to various embodiment are discussed in more detail herein.

Figure 2:
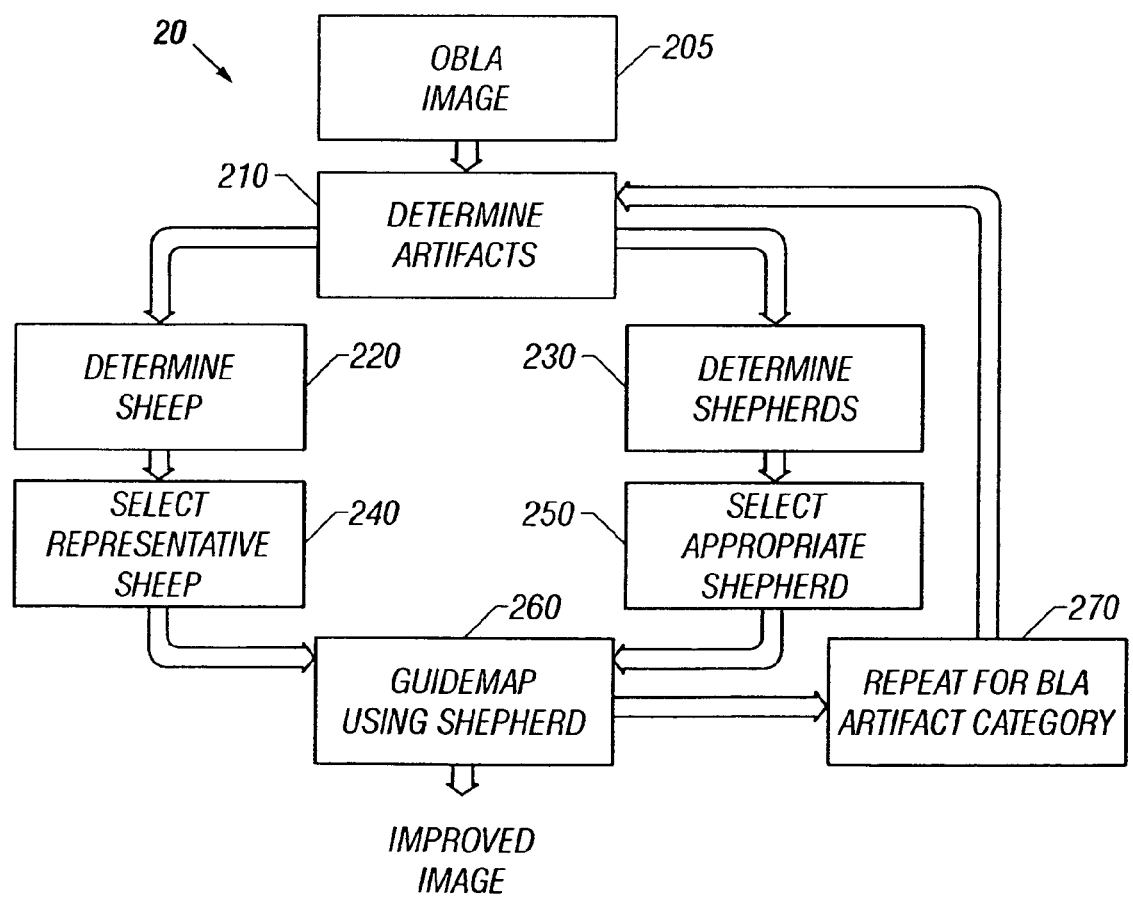
FIG. 2 is a flow diagram illustrating a method for image enhancement according to at least one embodiment of the present invention.

Referring next to FIG. 2, a method for image enhancement using sheep and shepherd artifacts is illustrated according to at least one embodiment of the present invention, and designated generally as sheep and shepherd method 200. Reference numerals in FIG. 2 that are common to reference numerals in FIG. 1 indicate like, similar or identical features or elements. Sheep and shepherd method 200 initiates with step 205, wherein a signal captured in a recording medium is extracted and converted to a form that can be manipulated. One embodiment wherein an image (the signal) captured on photographic film (the recording medium) is extracted by a film scanner or other device and converted to a digital data set (the form to be manipulated) representative of the information obtained from the photographic film will be used for illustration purposes. In other embodiments, other signals (captured on other mediums), such as x-ray scans, infrared images and radar images, may be enhanced by generally following the steps of sheep and shepherd method 200.

In one embodiment, a single image of a subject is used to guide sheep artifacts using shepherd artifacts within the image. Although one image of a subject can contain adequate information to use shepherd artifacts to guide sheep artifacts within the image, different images of a same subject often contain different or additional information about the subject that can prove useful in guiding artifacts. For example, a photograph of a subject, such as a flower, taken during the day will often have substantial color information, but may be lacking in detail as the lines, edges, and areas of demarcation are de-emphasized (i.e. fuzzy) due to the emphasis on the color. However, a photograph of the same flower taken at night may have substantial detail in the edges and lines, but have very little color information. The information in one of the images may be used as a shepherd artifact to guide the sheep artifact in the other image, thereby creating an enhanced image with greater detail without loss of the color information. Accordingly, at least one embodiment of the present invention includes the utilization of a plurality of images in sheep and shepherd method 200.

In step 205, information representing one or more images captured on photographic film is captured and converted to one or more digital data sets. In one embodiment, the photographic film is placed in a film scanner wherein information recorded on various layers of film sensitive to various frequency ranges of light, such as a red, green, and blue sensitive layer, is captured and digitized. In another embodiments, the one or more images are converted to a digital data sets during film development, such as during digital film processing, using a digital film development system, as discussed in greater detail with reference to FIGS. 8–18. Alternately, in one embodiment, the one or more images are digitized using a scanner to capture images from one or more photographs. In situations where the one or more images are captured and recorded using a digital device, such as a digital camera, the one or more images will already be represented as digital data sets, thereby eliminating the need for conversion to a digital form for processing.

In at least one embodiment, sheep and shepherd method 200 is performed using an information processing system, described in greater detail subsequently. In this case, step 205 can also include the steps of storing and/or transferring the digital image to the information processing system. For example, the digital image could be captured using a film scanner or digital camera. As a result, the digital image could be transmitted from the film scanner or digital camera to a workstation (the information handling system) for image enhancement. The digital image could be transmitted via a serial connection, a parallel connection, over the Internet, and the like. Although one embodiment includes an information handling system to processes a digital image as digital data, other embodiments include other methods of handling an image in other forms, such as an analog signal.

In step 210, artifacts are identified in the one or more captured images. In at least one embodiment, artifacts are determined by varying a parameter in relation to the initial image capturing processes, such as light intensity, the frequency of the radiation emitted from a radiation source, and the like. For example, the previous day and night image example, the time of day (i.e. changes in light intensity) could be the varied parameter used to capture different images of the same subject. In this case, the image of the subject taken during the day could produce one or more artifacts, while the image taken at night could produce one or more different artifacts. In another embodiment, artifacts are determined by varying a parameter during the conversion of the recorded image to a digital data set representative of the image. For example, during film development, a plurality of images could be captured of the film in various phases of development, with each of the plurality of images containing different artifacts having different information with regard to color and detail. In another example, the different layers of photographic film sensitive to different frequencies of light, such as the red, green, and blue layers, could be used to determine different artifacts for each of the color layers. Note that other methods of determining artifacts from signals may be used without departing from the spirit or the scope of the present invention.

In at least one embodiment, artifacts determined in step 210 are associated into one or more categories defined by a property, such as detail, intensity, hue, etc. For example, in a case where multiple images of a subject are used to determine artifacts, artifacts determined to have substantial detail information may be categorized together, while artifacts determined to have substantial color hue information may be grouped together in an associated category. It will be appreciated that other appropriate properties may be used to categorize artifacts.

In step 220, sheep artifacts (sheep artifact 120, FIG. 1) are identified from the artifacts determined in step 210. In at least one embodiment, the sheep artifacts are determined by comparing the "signal-to-noise ratio (SNR)" of a certain property for a selected artifact with the signal-to-noise ratios of the remaining artifacts, where the sheep artifacts are identified as having a relatively low SNR for the certain property. Similarly, in step 230, shepherd artifacts (shepherd artifact 110, FIG. 1) are determined from the artifacts in step 210. As with the sheep artifacts, in at least one embodiment, shepherd artifacts are determined by comparing the SNR (or quality) of a certain property for a selected artifact with the SNRs of the remaining artifacts, where shepherd artifacts generally have a high SNR for the certain property. The term "signal-to-noise ratio (SNR)," as used herein, refers to the ratio of the amount of information associated with desired property or characteristic in a signal to the sum amount of information associated with the undesired properties or characteristics. The SNR of an artifact for a given property can be determined using a variety of techniques, such as a subjective determination by a user, measurement using electronic equipment, application of a mathematical algorithm to the digital data representative of an image, and the like. As an example of the implementation of a signal-to-noise ratio, if a selected artifact has considerable edge information or detail but very little color intensity information in relation to other artifacts, the selected artifact could be said to have a relatively high SNR (or quality) for edge content, while having a relatively low SNR (or quality) for color intensity. In this example, the artifact could be considered a sheep artifact if the guiding property is color intensity, since the SNR of the artifact is relatively low. Likewise, the artifact could be considered a shepherd artifact if the guiding property or category is sharpness or detail. Note that an artifact can be both a sheep artifact for one guiding property or category and a shepherd artifact for a different guiding property or category. As noted previously, sheep artifacts are generally associated with variable parameters, such as color, intensity, hues, tone, and the like, whereas shepherd artifacts are normally, but not necessarily, associated with sharpness, edges, lines, and other distinct boundaries.

After the sheep artifacts for a particular property are identified in step 220, in one embodiment, a representative sheep artifact is determined in step 240. The representative sheep artifact may be determined using a variety of methods, such as calculating an average or weighted average of all associated sheep artifacts to derive a representative sheep artifact. Another example is to use the sheep artifact with either the highest or lowest SNR for the selected property. Likewise, a representative shepherd artifact is determined from the one or more shepherd artifacts.

The representative shepherd artifact, in one embodiment, is selected based on a desired image enhancement outcome. For example, if a captured image originally exhibits proper color information, such as intensity and hue, but lacks adequate sharpness or detail, increasing detail could be a desired image enhancement outcome. In this example, the selection of the representative shepherd artifact could be based on selecting the shepherd artifact exhibiting the greatest amount of image detail, such as distinct edges. In other situations where other image enhancement outcomes are desired, such as noise reduction, a shepherd artifact exhibiting a desired property to the greatest extent can be chosen. Representative sheep and/or shepherd artifacts, in one embodiment, are selected using a mathematical algorithm to process data sets representative of one or more images on a digital film development system or other processing system. In other embodiments, representative sheep and/or shepherd artifacts may be chosen by subjective determination by a user, using electronic measurement equipment, etc. It will be appreciated that one or more representative sheep and/or shepherds may be chosen for a given property or image enhancement outcome. Methods of determining representative shepherd artifacts are discussed in greater detail subsequently with reference to FIGS. 3 and 4, and methods of determining representative sheep artifacts are discussed in greater detail with reference to FIGS. 3 and 5.

After determining the appropriate representative sheep and shepherd artifacts, the representative shepherd artifact, in one embodiment, is used as a guide for altering the representative sheep artifact in step 260 to produce an enhanced artifact. A variety of methods according to various embodiments may be used to for guiding sheep artifacts using shepherd artifacts. In one embodiment, discussed in greater detail with respect to FIG. 7, a Fourier transform is performed on both the representative sheep and shepherd artifacts, resulting in a magnitude and phase for the various elements of the artifacts. The phase of the representative sheep artifact is replaced by the phase of the representative shepherd artifact, while the magnitude of the representative sheep artifact is limited by the representative shepherd artifact. The resulting artifact exhibits an enhanced property over the original representative sheep artifact. For example, recall that shepherd artifacts generally relate to artifacts associated with sharpness or edges, while sheep artifacts are generally associated with color intensities, hue, etc. So by replacing the phase of the sheep artifact with the phase of the shepherd artifact, and limiting the magnitude of the sheep artifact by the magnitude of the shepherd artifact, the resulting artifact retains the color information while exhibiting increased image detail.

In another example, a representative shepherd artifact may be used to guide a representative sheep artifact during a blurring operation. If the sheep artifact includes color information having noise, a common method of noise reduction is to the blur the image portion where noise exists. However, blurring often causes a reduction in detail around edges and other lines or areas of contrast or demarcation. In one embodiment, the representative shepherd artifact guides the blurring process of the representative sheep artifact. In this case, the representative shepherd artifact could be used to determine areas of detail in the representative sheep image, and the blurring process on the representative image could be reduced or avoided in the determined detailed areas. It will be appreciated that other methods of guiding a sheep artifact using a shepherd artifact may be used without departing from the spirit or the scope of the present invention.

After guiding the representative sheep artifact using the representative shepherd artifact for a certain property, another property may be selected from a group of desired properties in step 270, after which steps 210 through steps 260 are repeated for each desired property. For example, a resultant image with enhanced detail, color intensity, and hue could be desired. In a first cycle, a representative shepherd exhibiting high quality detail and a representative sheep artifact exhibiting high quality color intensity could be determined in steps 220 through steps 250. Then in step 260, the shepherd artifact guides the sheep artifact, resulting in a first guided artifact 130 (FIG. 1) having enhanced detail and color intensity. In step 270, the second property or category of hue is chosen, and steps 220–250 are repeated using hue as the desired sheep artifact property, while the representative shepherd artifact remains the same as in the previous cycle. In a second step 260, the shepherd artifact guides the sheep artifact having high quality hue information, resulting in a second guided artifact 130 having enhanced detail and hue. The first and second artifacts 130 may then be combined to produce an image having enhanced detail, color intensity, and hue (enhanced image 140, FIG. 1) over the original image.

As previously discussed, in at least one embodiment, images captured on photographic film are enhanced using sheep and shepherd method 200 during digital film processing. Photographic film can include a plurality of layers, each layer sensitive to a different range of frequencies of radiation, such as red, green, and blue visible light. When photographic film is exposed, each layer records an image of a subject representative of the range of frequencies associated with each layer. Using digital film processing, the image recorded on each film layer may be captured and processed jointly or separately from the other layer images to form a final image. Since each film layer captures different image information (i.e. different radiation frequencies) some image information may be present in some film layers but not present in others. In at least one embodiment, the present invention utilizes the information in separate film layers to guide and be guided to enhance the final image.

Figure 3:
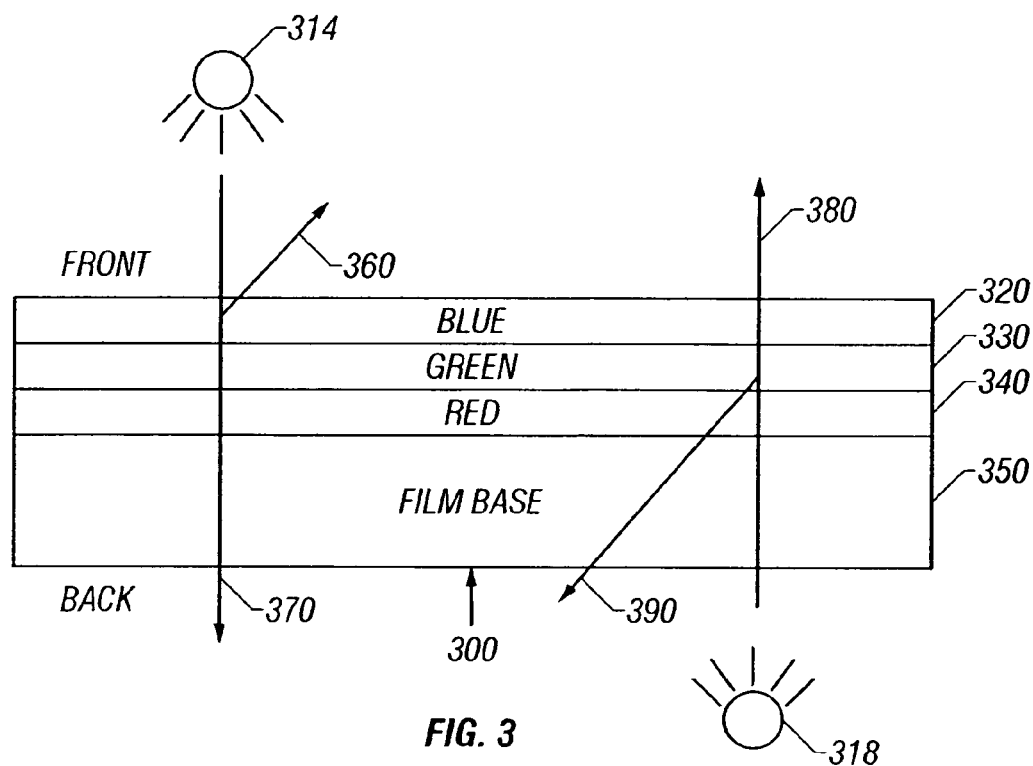
FIG. 3 is a side view of a cross-section of film according to at least one embodiment of the present invention.
Figure 4:
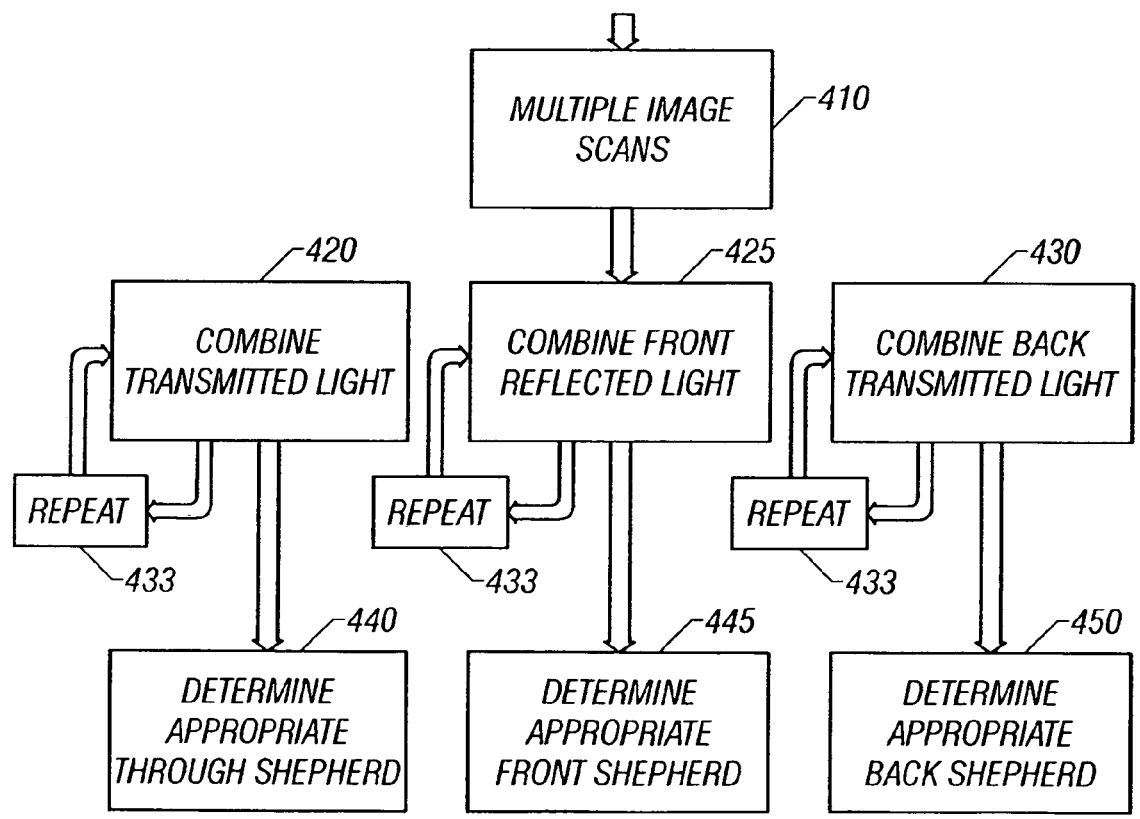
FIG. 4 is a flow diagram illustrating a method for determining representative shepherd artifacts according to at least one embodiment of the present invention.
Figure 5:
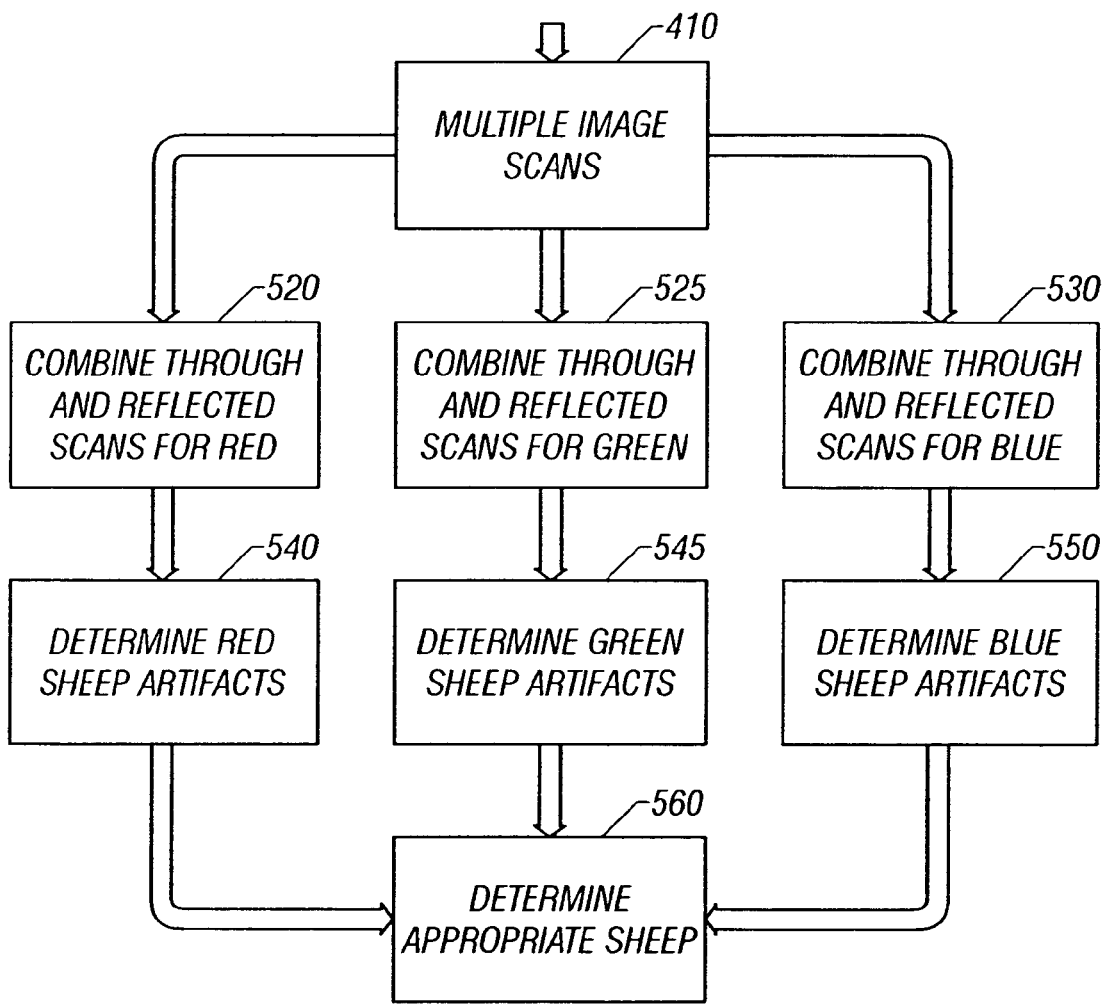
FIG. 5 is a flow diagram illustrating a method for determining representative sheep artifacts according to at least one embodiment of the present invention.

For ease of subsequent discussion of the methods of FIGS. 4 and 5, a brief description of a method of digital film processing is illustrated with reference to FIG. 3. Film 300 includes, from the front of film 300 to the back, blue layer 320, green layer 330, red layer 340 and film base 350. In one embodiment blue layer 320 includes an emulsion sensitive to the blue spectrum of visible light, green layer 330 includes an emulsion sensitive to the green spectrum of visible light, and red layer 340 includes an emulsion sensitive to the red spectrum of visible light. Film base 350 typically is transparent, allowing radiation to be transmitted without significant interference. It will be appreciated that film 300 can also include multiple film layers sensitive to one or more additional color bands, or film 300 can include other film layers sensitive to other parts of the radiation spectrum, such as infrared or ultraviolet. It will also be appreciated that film layers 320–350 may occur in a different sequence on film 300.

In at least one embodiment, separate image captures of blue layer 320, green layer 330, and red layer 340 are performed using transmitted and reflected light produced by a film scanner or other appropriate device. Front light 314 transmits radiation to the front of film 300, while back light 318 transmits radiation to the back of film 300. Front light 314 and back light 318 can emit various types of radiation, such as white light, visible light of a certain spectrum or color, infrared light, and the like. It will be appreciated that the type of radiation emitted may be selected based on the properties of film 300 and its layers and/or on the desired results of image capture and processing.

Light, or radiation, emitted from front light 314 and back light 318 may be used to determine the image information recorded or represented in each film layer 320–340. For example, front transmitted light 370, back transmitted light 380, front reflected light 360, and back reflected light 390 all contain information from each of the blue layer 320, green layer 330, and red layer 340. Methods known to those skilled in the art, such as matrix regression, may be utilized to extract the image information recorded in each film layer 320, 330, 340. Additionally, image information from each layer 320, 330, 340 of film 300 could be captured using varying parameters, such as different radiation intensities or frequencies of lights 314, 318, or by image capture at varying points in time during digital film processing. As noted previously, by varying these parameters, multiple artifacts with different properties may be extracted from film 300. As discussed in greater detail subsequently, the image information for each film layer 320, 330, 340 captured during digital film processing may be stored and retrieved as a one or more separate images for each layer, represented by data sets, for use in a method of enhancing images using sheep and shepherd artifacts.

Recall that shepherd artifacts determined from one or more images can be used to guide sheep artifacts determined from the same or different images to produce an enhanced image. Referring now to FIGS. 3 and 4, a method for determining one or more representative shepherd artifacts is illustrated and referred to generally as shepherd method 400. For ease of illustration, shepherd method 400 is demonstrated using one or more images recorded on photographic film (film 300) illustrated with reference to FIG. 3. Steps 410, 420, 425, 430 and 433 are one embodiment of step 205 and steps 440–450 are one embodiment of steps 210, 230, and 250 of sheep and shepherd method 200 illustrated with reference to FIG. 2. Note that other various methods may be employed similar to shepherd method 400 to record digital representations of signals recorded on a variety of mediums without departing from the spirit or the scope of the present invention.

Shepherd method 400 commences with step 410 wherein a plurality of images are captured from a photographic film (film 300). In addition to other representations of images captured from film 300, in one embodiment, the plurality of images may represent the resulting images of front transmitted light 370, back transmitted light 380, front reflected light 360, and/or back reflected light 390, with each light transmission method having at least one resulting image captured. In step 420, the one or more images representing transmitted lights 370, 380 are combined to yield a combined transmitted light image C. A variety of combination methods known to those skilled in the art may be used, such as a stitching matrix method (as described in U.S. Pat. No. 5,998,896 and U.S. patent application Ser. No. 09/255,401, titled "Parametric Image Stitching"). Similarly, in step 425 the one or more images representing front reflected light 360 are combined using the same method as in step 420 to yield combined reflected light image F. In step 430, the one ore more images representing back reflected light 390 are combined in a similar manner as in steps 420 and 425 to yield combined back reflected light image B.

Next, in each of steps 420, 425, and 430 a color difference determination is made according to the formula:

$$C-(\tfrac{1}{3}*R)-(\tfrac{1}{3}*B)=T$$

where T is a value for the transmitted light image less the reflected light image R and back reflected light image B. In step 433, steps 420, 425, and 430 are repeated for each of the multiple film layers or colors detected in film 300, such as the blue, green, and red layer.

After steps 420, 425, and 430 are repeated for each color, there will be a plurality of T, R, and B images for each of the multiple film layers or colors. In step 440, one or more representative "through" shepherd artifacts are selected from the plurality of T images, in step 445 one or more representative "reflected" shepherd artifacts are selected from the plurality of R images, and in step 450 one or more representative "back" shepherd artifacts are selected from the plurality of B images. In at least one embodiment, the one or more shepherd artifacts are selected based on a desired outcome of a shepherd artifact guiding a sheep artifact. A variety of methods of selecting the appropriate representative shepherd artifact may be used. These methods can include, but are not limited to, comparison of the SNR, as describe previously, selecting certain shepherd artifacts with properties more relevant to detail than others, subjective determination by a user, and the like. In one embodiment, the "through", "reflected", and "back" representative shepherd artifacts are selected from one image layer or color only, while in another embodiment, the shepherd artifacts can be chosen from multiple image layers or colors. The resulting representative shepherd artifacts are herein referred to as $T_{shepherd}$, $R_{shepherd}$, and $B_{shepherd}$ for each of the T, R, and B images respectively.

As discussed previously, sheep artifacts are guided by shepherd artifacts to enhance one or more properties exhibited by the sheep artifacts. In a method similar to shepherd method 400, sheep artifacts are determined based on one or more desired properties, with sheep artifacts generally having information with more noise (i.e. a lower SNR) for the desired properties. Referring now to FIGS. 3 and 5, a method for determining sheep artifacts is illustrated and referred to generally as sheep method 500. For ease of illustration, sheep method 500 is demonstrated using one or more images recorded on photographic film (film 300) illustrated with reference to FIG. 3. Steps 410, 520, 525, 530 are one embodiment of step 205, steps 540, 545, 550 are one embodiment of steps 210, 220, and step 560 is one embodiment of step 240 of sheep and shepherd method 200 illustrated with reference to FIG. 2. Note that other various methods may be employed similar to sheep method 500 to record digital representations of images recorded on a variety of mediums without departing from the spirit or the scope of the present invention.

Sheep method 500 commences with step 410, as discussed previously with reference to FIG. 4, wherein a plurality of images are captured from a photographic film (film 300). Recall that the plurality of images may represent the resulting images of front transmitted light 370, back transmitted light 380, front reflected light 360, and/or back reflected light 390, with each light transmission method having at least one resulting image captured.

In step 520, the one or more images obtained using transmitted lights 370, 380 associated with red layer 340 are combined to yield combined transmitted light image $C_{red}$ and one or more images obtained using front reflected light 360 are combined to yield combined front reflected image $F_{red}$ for the red layer. Step 520 also includes combining one or more images obtained using back reflected light 390 associated with the red layer 340 to yield combined reflected light image $B_{red}$ for red layer 340. Similarly, in step 525, the one or more images obtained using transmitted lights 370, 380 associated with green layer 330 are combined to yield combined transmitted light image $C_{green}$, and one or more images obtained using front reflected light 360 are combined to yield combined front reflected image $F_{green}$ for green layer 330. Step 525 also includes combining one or more images obtained using back reflected light 390 associated with the green layer 330 to yield combined reflected light image $B_{green}$ for green layer 330. Likewise, in step 530, combined transmitted light image $C_{blue}$ combined front reflected image $F_{blue}$, and combined back reflected light image $B_{blue}$ are developed in a similar manner for blue layer 320. A variety of combination methods known to those skilled in the art may be used, such as a stitching matrix method. Another combination method may include averaging each of the light images.

In steps 540, 545, and 550, one or more red, green, and blue sheep artifacts are derived for each of the film layers 320, 330, 340 (i.e. red, green, and blue). In step 540, a red sheep artifact, a green sheep artifact, and a blue sheep artifact, herein referred to as $R_{red}$ sheep artifact, $G_{red}$ sheep artifact, and $B_{red}$ sheep artifact, are determined for red layer 340 as follows:

$$G_{red} \text{sheep} = 2*C_{red} - F_{red} - B_{red}$$

$$R_{red} \text{sheep} = B_{red}$$

$$B_{red} \text{sheep} = F_{red}$$

In step 545, a red sheep artifact, a green sheep artifact, and a blue sheep artifact, herein referred to as $R_{green}$ sheep artifact, $G_{green}$ sheep artifact, and $B_{green}$ sheep artifact, are determined for green layer 330 as follows:

$$G_{green} \text{sheep} = 2*C_{green} - F_{green} - B_{green}$$

$$R_{green} \text{sheep} = B_{green}$$

$$B_{green} \text{sheep} = F_{green}$$

In step 550, a red sheep artifact, a green sheep artifact, and a blue sheep artifact, herein referred to as $R_{blue}$ sheep artifact, $G_{blue}$ sheep artifact, and $B_{blue}$ sheep artifact, are determined for blue layer 320 as follows:

$$G_{blue} \text{sheep} = 2*C_{blue} - F_{blue} - B_{blue}$$

$$R_{blue} \text{sheep} = B_{blue}$$

$$B_{blue} \text{sheep} = F_{blue}$$

After determining the one or more red, green, and blue sheep artifacts for each of the film layers 320, 330, 340, one or more representative sheep artifacts are selected in step 560 to be guided by one or more previously selected representative shepherd artifacts to enhance an image. As discussed previously, the one or more representative sheep artifacts may be chosen based on a exhibited property or characteristic, or a representative sheep artifact may be determined by averaging some or all of the sheep artifacts, etc. For example, all of the red sheep artifacts ($R_{red}$, $R_{green}$, $R_{blue}$) could be averaged together to yield a representative red sheep artifact. Other methods of determining one or more representative sheep artifacts may be used without departing from the spirit or the scope of the present invention. Recall that after shepherd artifacts and sheep artifacts are determined, the representative shepherd artifacts guide the representative sheep artifact. In at least one embodiment of the present invention, R sheep artifact, G sheep artifact, and B sheep artifact are each guided by the respective $B_{shepherd}$, $T_{shepherd}$, and $F_{shepherd}$ associated with each film layer 320, 330, and 340 (i.e. blue, green, and red).

Figure 6:
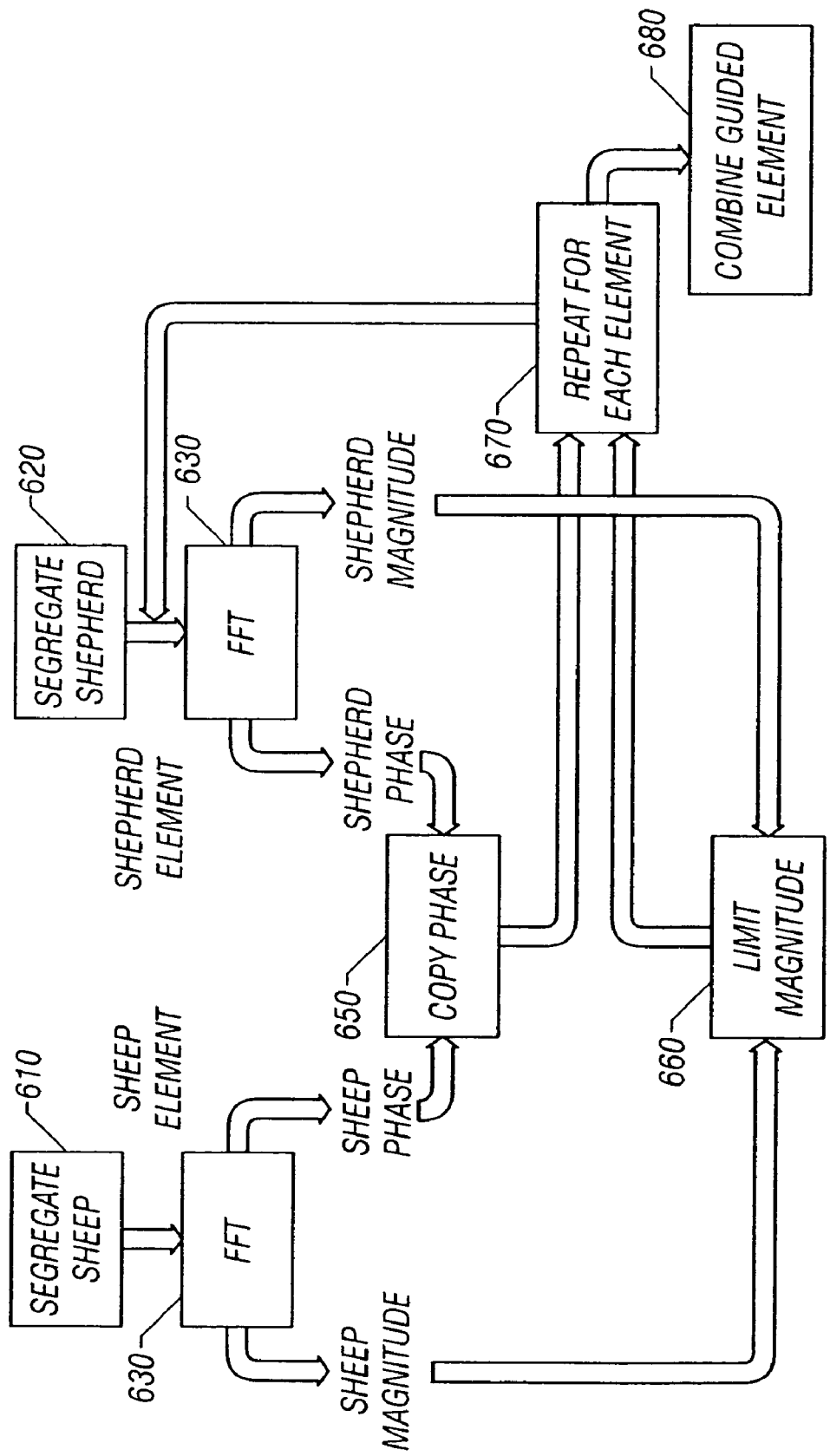
FIG. 6 is a flow diagram illustrating a method for guiding sheep artifacts using shepherd artifacts according to at least one embodiment of the present invention.
Figure 7:
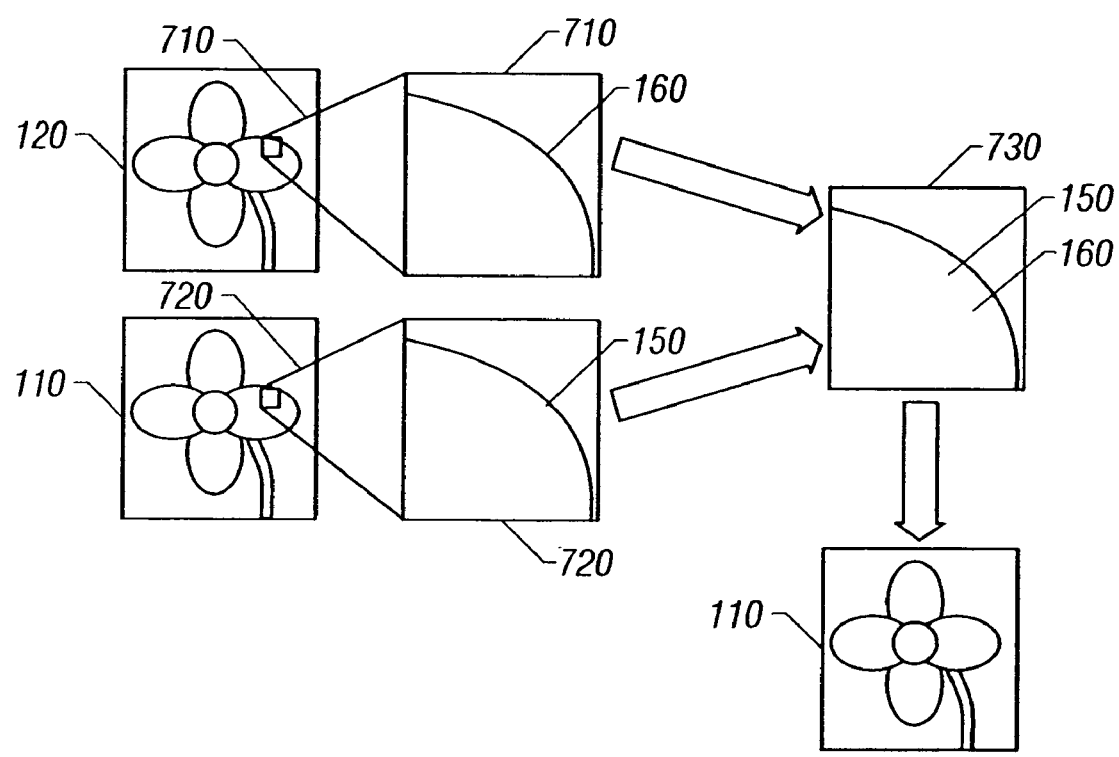
FIG. 7 is an illustration demonstrating the improvement in image quality using a sheep and shepherd method according to at least one embodiment of the present invention.

Referring next to FIGS. 6 and 7, a method for using shepherd artifacts to guide sheep artifacts is illustrated according to one embodiment of the present invention, and designated generally as guide method 600. Guide method 600 is an illustration of one embodiment of step 260 of sheep and shepherd sheep and shepherd method 200 discussed with reference to FIG. 2. Guide method 600 commences with step 610 where each representative sheep artifact 120, which has been selected as previously described, is segregated into a number of overlapping squares or elements (sheep element 710) for analysis. Similarly, in step 620, each representative shepherd artifact 110, selected as previously described, is segregated into a plurality of overlapping elements (shepherd element 720) for analysis.

In step 630, one of a plurality of sheep elements 710 is analyzed, in one embodiment, using Fourier analysis, such as using a discrete Fourier transform or, preferably, a fast Fourier transform (FFT). As a result of the FFT, each sheep element 710 has a corresponding magnitude and phase. In step 640, one of a plurality of shepherd elements 720 is analyzed using the method in step 630, resulting in a magnitude and phase for each shepherd element 720.

In step 650, the phase of shepherd element 720 calculated in step 630 is copied as the phase of guided element 730. In step 660, the magnitude of sheep element 710 is limited by the magnitude of the associated shepherd element 720. In at least one embodiment, step 660 can include additional sub-steps, such as further limiting the magnitude of sheep element 710 by the cosine of the magnitude of shepherd element 720. The limited magnitude is then copied as the magnitude of guided element 730. In at least one embodiment, guided element 730 is the element representing sheep element 710 after being altered using the associated shepherd element 720.

As a result of the phase of shepherd element 720 replacing the phase of the associated sheep element 710 and the magnitude of shepherd element 720 limiting the magnitude of the sheep element 710, the resulting element (guided element 730) exhibits improved quality over the original. For example, sheep element 710 has relatively high quality color information 160 but low quality edge detail. On the other hand, shepherd element 720 has relatively high quality edge 150 but low quality color information. Shepherd element 720 is used to guide the associated sheep element 710, as discussed in steps 610–660, to improve image detail in sheep element 710. In step 670, steps 610–660 are repeated for each element 720, 710 in artifacts 110, 120. After each element 710, 720 has been guided, the plurality of guided elements 730 are combined to produce guided artifact 130 with an enhanced property.

In at least one embodiment, guiding method 600 is repeated for each desired sheep artifact 120 or for each property or category of properties that are selected to be guided. For example, guiding method 600 could be executed on a sheep artifact (sheep artifact 120) exhibiting good color hue using a shepherd artifact (shepherd artifact 110) having good detail, resulting in a first guided artifact having good color hue and detail. Guiding method 600 could then be executed a second time on a sheep artifact exhibiting good intensity using the same shepherd artifact, resulting in a second guided artifact having good color intensity and detail. The first guided artifact and the second guided artifact could be combined, using a method such as an image block windowed blending operation, as described in U.S. patent application Ser. No. 09/247,264, titled "Image Block Windowed Blending". The result is a processed image having one or more enhanced properties, such as enhanced intensity, hue, and detail, over the original image.

As previously discussed, in at least one embodiment, a signal being processed by one or more methods of the present invention is an image recorded using photographic film. Since the image is represented by the film and cannot be easily manipulated or processed in its current form, in one embodiment, the image recorded in the photographic film is digitized for further processing. Conventional film digitization processes scan the film negative using a conventional electronic scanner to produce a digital image that electronically represents the photographic image. Conventional electronic film scanners generally operate by directing white light through the film negative. The light interacts with the dye image and the intensity of light transmitted through the film is recorded by a sensor that produces individual red, green and blue color data. The sensor color data is used to produce the digital image.

A relatively new process under development is digital film processing (DFP). DFP systems scan the film during the development process. DFP systems apply a thin coat of one or more film processing solutions to the film and then scan the film through the coating. Neither the processing solutions nor the silver compounds within the film are washed from the film. DFP systems may comprise a number of different configurations depending upon the method of film processing and the method of scanning the film. For example, in some embodiments, the metallic silver grains and silver halide are not modified and the film is scanned with visible light. Accordingly, in at least one embodiment, a digital film development system is used to digitize and process one or more images recorded in photographic film. One embodiment of a digital film development system is discussed with reference to FIGS. 8–20.

Figure 8:
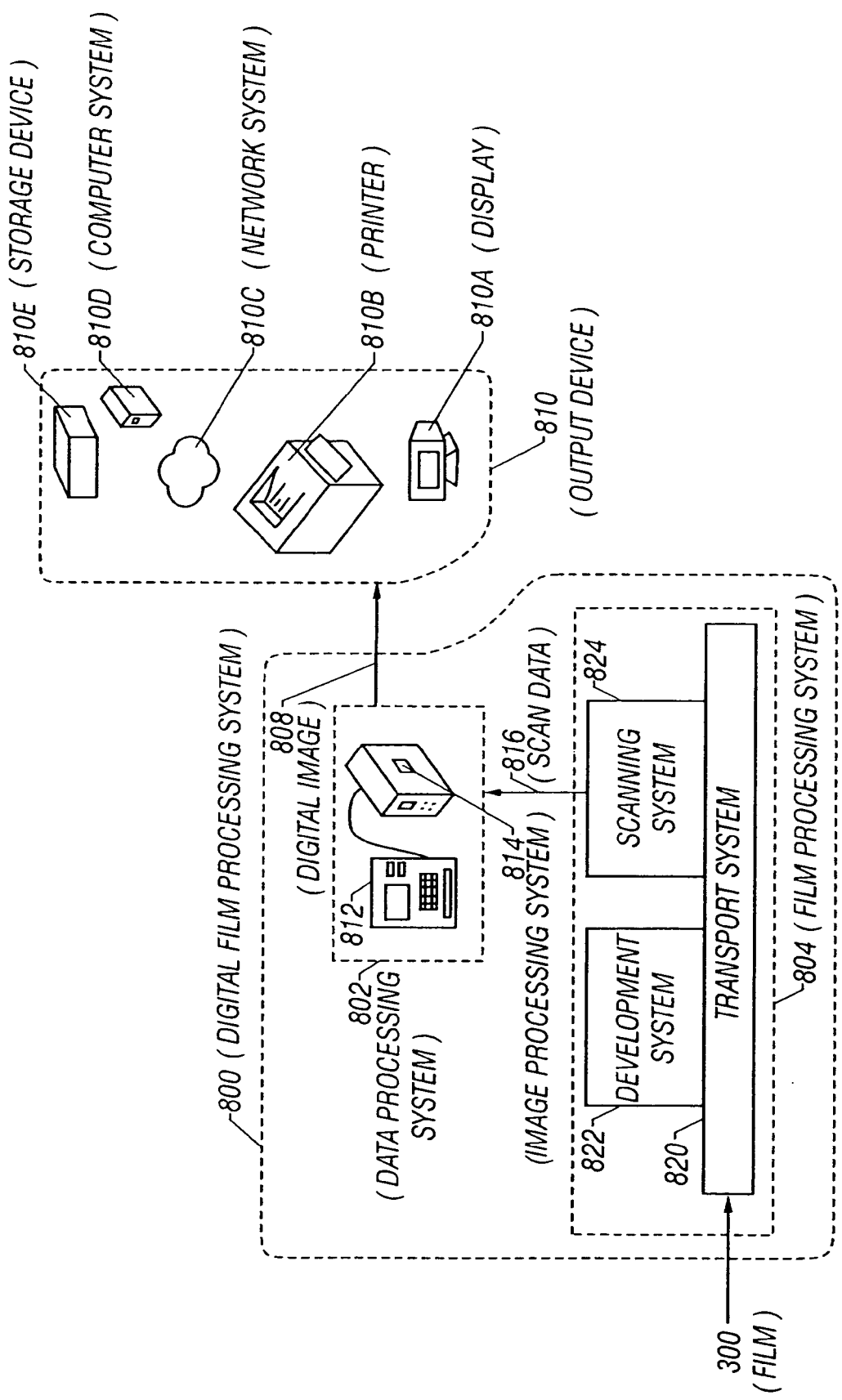
FIG. 8 is a block diagram of an improved digital film development system according to at least one embodiment of the present invention.

FIG. 8 is an example of one embodiment of a digital film development system 800. In this embodiment, the system 800 comprises a data processing system 802 and a film processing system 804 that operates to digitize a film 300 to produce a digital image 808 that can be output to an output device 810. Film 300, as used herein, includes color, black and white, x-ray, infrared or any other type of film and is not meant to refer to any specific type of film or a specific manufacturer.

Data processing system 802 comprises any type of computer or processor operable to process data. For example, data processing system 802 may comprise a personal computer manufactured by Apple Computing, Inc. of Cupertino, Calif. or International Business Machines of New York. Data processing system 802 may also comprise any number of computers or individual processors, such as application specific integrated circuits (ASICs). Data processing system 802 may include a user interface 812 operable to allow a user to input information into the system 800. The user interface 812 generally includes a display and a printer, but may also include such input devices as a keypad, point-of-sale device, voice recognition system, memory reading device such as a flash card reader, or any other suitable data input device.

Data processing system 802 includes image processing software 814 resident on the data processing system 802. Data processing system 802 receives sensor data 816 from film processing system 804. As described in greater detail below, sensor data 816 is representative of the image data and silver in the film 300 at each discrete location, or pixel, of the film 300. The sensor data 816 is processed by image processing software 814 to produce the digital image 808. The specific embodiment of the image processing software 814 is dependent upon the embodiment of the film processing system 804, and in particular, the specific embodiment of the scanning system, as described below. In an embodiment in which metallic silver grains and/or silver halide remains within the film 300, the image processing software 814 operates to compensate for the silver in the film 300. For example, one embodiment of image processing software 814 comprises software based on U.S. patent application Ser. No. 08/999,421, entitled Defect Channel Nulling, which is incorporated herein by reference. In this embodiment, any silver remaining in the film 300 is treated as a defect and each individual pixel color record is compensated to remove the effect of the silver. In an embodiment in which the metallic silver grains and silver halide have been modified to a substantially transparent silver compound, the film 300 may be scanned using only visible light without digitally compensating for any occlusions. Processing the film 300 without washing the silver from film 300 substantially reduces or eliminates the production of hazardous chemical effluents that are generally produced during conventional film processing methods. Although the image processing software 814 is described in terms of actual software, the image processing software 814 may be embodied as hardware, such as an ASIC. The color records for each pixel form the digital image 808, which is then communicated to one or more output devices 810.

Output device 810 may comprise any type or combination of suitable output devices for displaying, storing, printing, transmitting or otherwise outputting the digital image 808. For example, as illustrated, output device 810 may comprise a monitor 810a, a printer 810b, a network system 810c, a mass storage device 810d, a computer system 810e, or any other suitable output device. Network system 818c may be any network system, such as the Internet, a local area network, and the like. Mass storage device 810d may be a magnetic or optical storage device, such as a floppy drive, hard drive, removable hard drive, optical drive, CD-ROM drive, and the like. Computer system 810e may be used to further process or enhance the digital image 808.

As described in greater detail below, film processing system 804 operates electronically scan the film 300 to produce the sensor data 816. Light used to scan the film 300 may include light within the visible portion of the electromagnetic spectrum, light within the infrared portion of the electromagnetic spectrum, a combination of visible and infrared light, or any other suitable electromagnetic radiation. As illustrated, film processing system 804 comprises a transport system 820, a development system 822, and a scanning system 824. Although the system 800 is illustrated with a development system 822, alternative embodiments of the system 800 do not require the development system 822. For example, film 300 may have been preprocessed and not require the development process described below.

Transport system 820 operates to dispense and move the film 300 through the film processing system 804. In a preferred embodiment, the transport system 820 comprises a leader transport system in which a leader is spliced to the film 300 and a series of rollers advances the film 300 through the film processing system 804, with care taken that the image surface of the film 300 is not contacted. Similar transport systems 820 are found in film products manufactured by, for example, Noritsu Koki Co. of Wakayama, Japan, and are available to those in the art.

Figure 9:
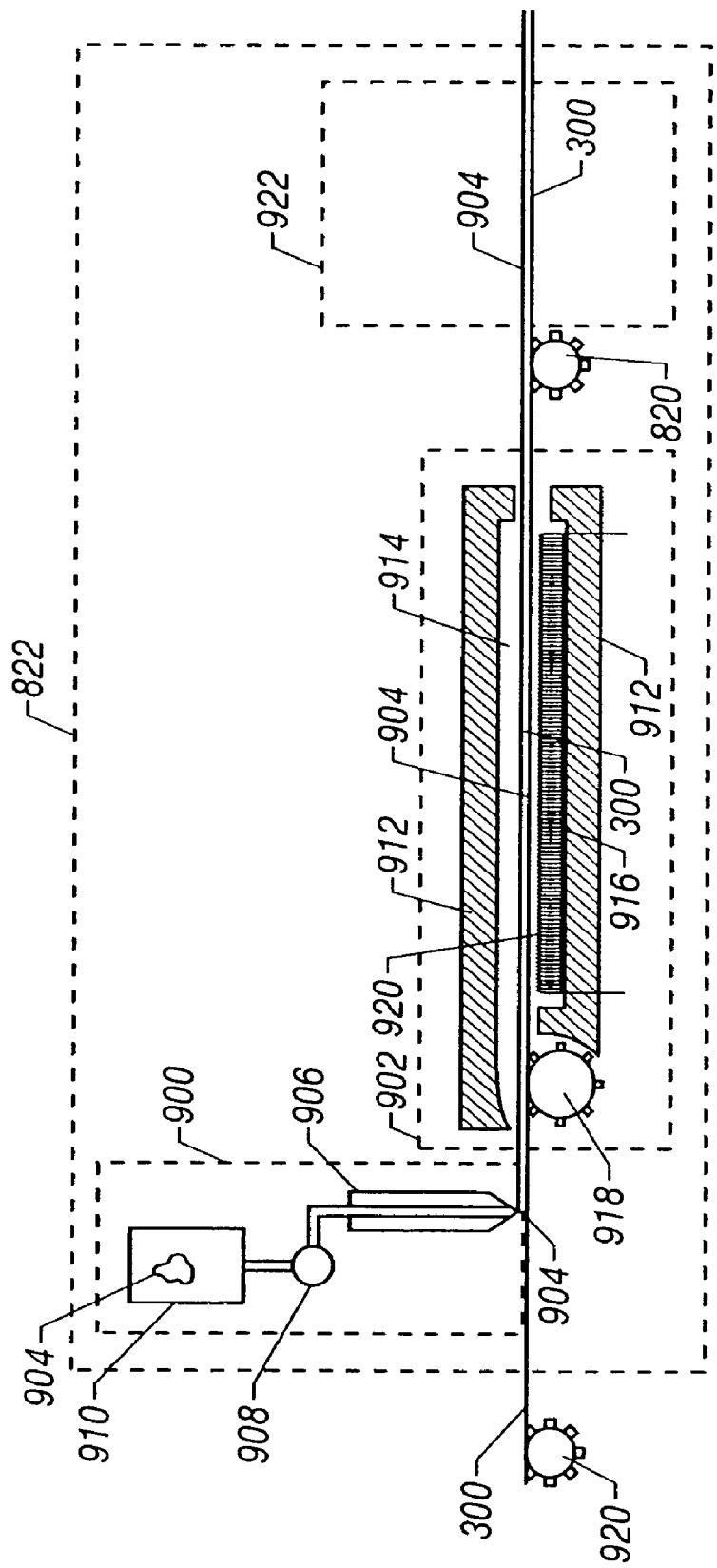
FIG. 9 is a block diagram illustrating a development system, as shown in FIG. 8, according to at least one embodiment of the present invention.

The development system 822 operates to apply one or more processing solutions to the film and develop the film 300, as described in greater detail in FIG. 9. In the preferred embodiment, the processing solution comprises a viscous color developer solution that initiates production of the metallic silver grains and the magenta, cyan and yellow dye images within the film 300. In an alternative embodiment, the processing solution comprises a black and white developer solution that initiates production of the metallic silver grains within the film 300. The processing solution may include other suitable processing agents. The development system 822 may also apply other suitable processing solutions, such as a stop solution, inhibitors, accelerators, bleach solution, fixer solution, bhx solution (combines the functionality of a bleach solution and a fixer solution), stabilizer solution and the like.

The scanning system 824 scans the film 300 through the processing solutions applied to the film 300, as described in greater detail in FIGS. 14–18. In other words, the processing solutions are not substantially removed from the film 300 prior to the scanning process. In contrast, conventional film processing systems wash the contaminated processing solutions and hazardous silver compounds from the film and then dry the film to create a conventional film negative prior to any digitization process. The scanning station 824 may comprise a number of different configurations depending, in part, on how the film 300 was developed. In general, specific colors of visible light interact with the dye images and any silver present in the film 300, and infrared light interacts with the silver in the film 300. In some embodiments of the development system 822, the silver (metallic silver and/or silver halide) is modified to reduce the optical effects of the silver. For example, a bleaching agent may be applied to the film 300. The bleaching agent operates to oxidize the metallic silver grains within the film 300 to produce silver halide. The silver halide has a lower optical density than the metallic silver grains. As a result, a greater amount of light is transmitted through the film 300. Another example is a fixer agent. A fixer agent dissolves the silver halide to produce a silver compound that is substantially transparent to light. As a result, light is readily transmitted through the film 300.

The scanning station 824 scans the film 300 using electromagnetic radiation and produces sensor data 816 representative of the film image data, as described in greater detail in FIGS. 14–18. In the preferred embodiment of the scanning station 824, the film 300 is scanned with light within the visible and infrared portions of the electromagnetic spectrum. The visible light measures the light intensity associated with the dye clouds as well as the silver within the film 300, and the infrared light measures the light intensity associated with the metallic silver grains within the film 300. In particular, one or more bands of visible light may be used to scan the film 300. For example, the film 300 may be scanned using visible light within the red, green and/or blue portions of the electromagnetic radiation spectrum. In other embodiments of the scanning station 824, the film 804 is scanned with only visible light, with only infrared light, with different combinations of visible light, or any other suitable electromagnetic radiation. The processing solutions are not substantially removed prior to scanning the film 300. In contrast, conventional film processing systems wash all the processing solutions and silver, both silver halide and metallic silver, from the film 300 prior to any conventional scanning processes. Silver, whether metallic silver or silver halide crystals, in the film negative interferes with the transmission of light through the film negative and would be digitized along with the image. Any silver in the film negative appears as defects in the resulting digital image.

In operation, exposed, but undeveloped film 300 is fed into the transport system 820. The film 300 is transported through the development system 822. The development system 822 applies a processing solution to the film 300 that develops the film 300. The transport system 820 moves the film 300 through the scanning system 824. The scanning system 824 illuminates the film 300 with light. Light from the film 300 is measured by the sensor system, which produces sensor data 816. The sensor data 816 represents film image data in the film 300 at each pixel. The sensor data 816 is communicated to data processing system 802. The data processing system 802 processes the sensor data 816 using image processing software 814 to produce the digital image 808. The data processing system 802 may also operate to enhance or otherwise modify the digital image 808. For example, the digital image 808 may be modified in accordance with input from the user. The data processing system 802 communicates the digital image 808 to the output device 810 for viewing, storage, printing, communicating, or any combination of the above.

In a particular embodiment of the digital film development system 800 the system 800 is adapted to a self service film processing system, such as a kiosk. Such a self service film processing system is uniquely suited to new locations because no plumbing is required to operate the self service film processing system. In addition, the developed images can be prescreened by the user before they are printed, thereby reducing costs and improving user satisfaction. In addition, the self service film processing system can be packaged in a relatively small size to reduce the amount of floor space required. As a result of these advantages, a self service film processing system can be located in hotels, college dorms, airports, copy centers, or any other suitable location. In other embodiments, the system 800 may be used for commercial film lab processing applications. Again, because there is no plumbing and the environmental impact of processing the film 300 is substantially reduced or eliminated, the installation cost and the legal liability for operating such a film lab is reduced. The system 800 can be adapted to any suitable application without departing from the scope and spirit of the invention.

FIG. 9 illustrates one embodiment of the development system 822. In this preferred embodiment, a development system 822a comprises an applicator station 900 and a development station 902. The applicator station 900 operates to apply a relatively uniform coating of a processing solution 904 to the film 300. In one embodiment, the processing solution 904 comprises a color developer solution, such as Flexicolor Developer for Process C-41 available from the Eastman Kodak Company. In other embodiments, the processing solution 904 comprises other suitable solutions. For example, the processing solution 904 may comprise a monobath solution that acts as a developer and stop solution.

In a particular embodiment, the applicator station 900 comprises an applicator 906, a fluid delivery system 908, and a reservoir 910. The applicator 906 operates to coat the film 300 with the processing solution 904. In the preferred embodiment, as illustrated, the applicator 906 comprises a slot coater device. In alternative embodiments, the applicator 906 comprises an ink jet applicator, a tank, an aerosol applicator, drip applicator, sponge applicator, or any other suitable device for applying the processing solution 904 to the film 300. The fluid delivery system 908 delivers the processing solution 904 from the reservoir 910 to the applicator 906. In an embodiment in which the applicator 906 comprises a slot coater device, the fluid delivery system 908 generally delivers the processing solution 904 at a constant volumetric flow rate to help insure uniformity of coating of processing solution 904 on the film 300. The reservoir 910 contains a sufficient volume of processing solution 904 to process multiple rolls of film 300. In the preferred embodiment, the reservoir 910 comprises a replaceable cartridge. In other embodiments, the reservoir 910 comprises a refillable tank. The applicator station 900 may comprise other suitable systems and devices for applying the processing solution 904 to the film 300.

The development station 902 operates to give the film 300 time to develop prior to being scanned by the scanning system 824. In the embodiment illustrated, the development station 902 forms that portion of the transport system 820 between the applicator 906 and the scanning system 824. The length of the development station 902 is generally dependent upon the development time of the film 300. In particular, depending upon the environment and chemical nature of the processing solution 904, development of the film 300 may require as little as a few seconds to as long as several minutes.

As illustrated, the development station 902 comprises a cover 912 that protects the film 300 during development. The cover 912 forms an environmental chamber 914 surrounding the film 300. The temperature and humidity within the environmental chamber 914 are strictly controlled. To facilitate controlling the temperature and humidity, the environmental chamber 914 has a minimum volume surrounding the film 300. The cover 912 may be insulated to maintain a substantially constant temperature as the film 300 is developed. In order to maintain the temperature, the development station 902 preferably includes a heating system 916. As illustrated, the heating system 916 may include a heated roller 918 and heating element 920. In addition, the heating system 916 may include a processing solution heating system (not expressly shown) that heats the processing solution 904 prior to its application to the film 300.

In an alternative embodiment, the development system 822 includes a processing station 922. The processing station 922 operates to further process the film 300 prior to being scanned by the scanning system 824. For example, in on embodiment, the processing station 922 operates to modify the metallic silver grains and or silver halide in the film 300. Modifying the silver within the film 300 decreases the opacity of the film 300, thereby improving the transmissivity of light through the film 300. In another embodiment, the processing station 922 operates to retard or substantially reduce the continued development of the film 300. Retarding or substantially stopping the continued development of the film 30006 increases the amount of time the film 300 can be exposed to visible light without substantially fogging of the film 300. In another embodiment, the processing station 922 operates to modify the silver and also substantially reduce the continued development of the film 300. FIGS. 10–13 illustrate different examples of the processing station 922.

In operation, transport system 820 transports the film 300 through the applicator station 900. Fluid delivery system 908 dispenses the processing solution 904 from the reservoir 910 through the applicator 906 onto the film 300. The processing solution 904 initiates development of the dye image and silver image within the film 300. The coated film 300 is then transported through the development station 902. As discussed above, the development station 902 allows the film 300 time to develop within a controlled environment. In an alternative embodiment, the film 300 is then transported through the processing station 922 where the film 300 is further processed. The film 300 is then transported by the transport system 820 to the scanning system 824. As described above, the processing solution 904 coated on the film 300 is not removed, but remains on the film 300 as the film 300 is transported to the scanning system 824.

Figure 10:
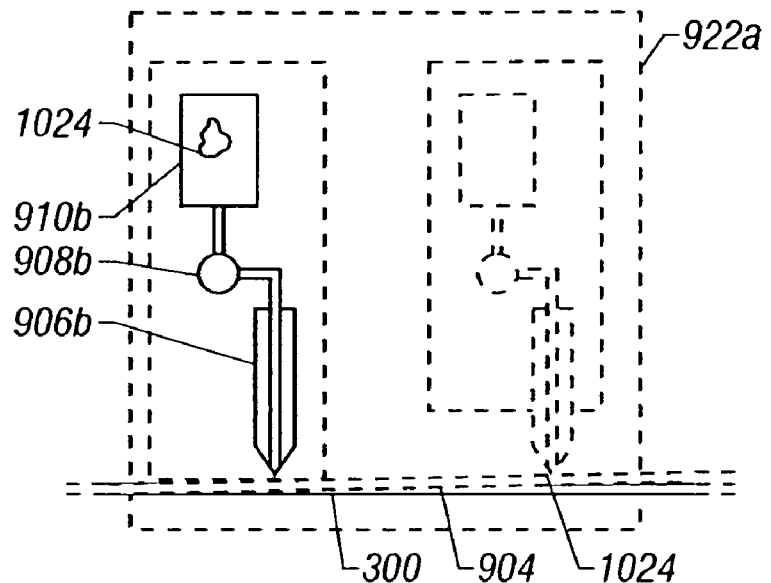
FIG. 10 is a block diagram illustrating another embodiment of the development system, as shown in FIG. 8, according to at least one embodiment of the present invention.

FIG. 10 illustrates a processing station 922a that operates to apply one or more processing solutions 1024 to the film 300. As illustrated, the processing station 922a comprises an applicator 906b, a fluid delivery system 908b, and a reservoir 910b, similar in function and design as applicator station 900 described in FIG. 9. Although a single applicator 906b, fluid delivery system 908b, and reservoir 910b is illustrated, the processing station 922a may comprise any number of applicators 906b, fluid delivery systems 908b, and reservoirs 910b that apply other suitable processing solutions 1024 and other suitable solutions.

The processing solution 1024 may comprise any suitable chemical applied to the film 300 to further process the film 300. In one embodiment, the processing solution 1024 includes a fixer solution. As discussed previously, the fixer solution dissolves the silver halide into a substantially transparent silver compound. This has the effect of slightly reducing the opacity of the film 300, but substantially eliminating the sensitivity of the film 300 to any type of light. In another embodiment, the processing solution 1024 includes a bleaching agent. The bleaching agent converts the metallic silver within the film 300 into silver halide. As a result, the opacity of the film 300 is greatly reduced, but the sensitivity of the film 300 to light is not substantially reduced. In yet another embodiment, both a bleaching agent and a fixing agent are applied to the film 300, or a single blix solution (combines functions of a bleaching agent and fixing agent). This has the effect of substantially reducing the opacity of the film 300 and also substantially reducing the sensitivity of the film 300 to light. The processing solution 1024 may also include an aqueous solution, stopping agents, stabilizing agents, or any other suitable film processing agent or solutions without departing from the scope of the invention.

Figure 11:
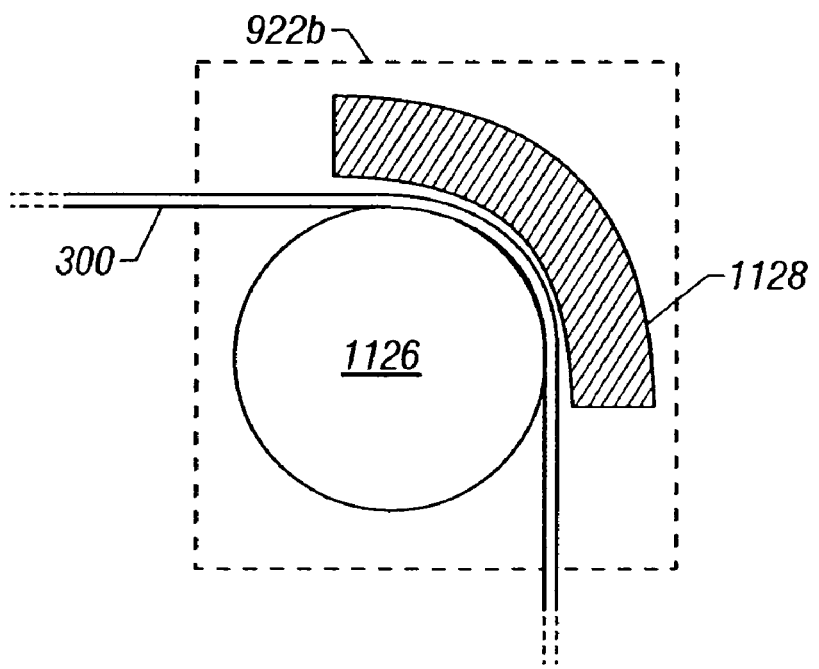
FIGS. 11 through 13 are block diagrams illustrating various embodiments of a processing station, as shown in FIG. 10, according to at least one embodiment of the present invention.

FIG. 11 illustrates a processing station 922b that operates to chill the developing film 300. Chilling the developing film 300 substantially slows the chemical developing action of the processing solution 904. In the embodiment illustrated, the processing station 922b comprises an electrical cooling roller 1126 and insulation shield 1128. In this embodiment, the cooling roller 1126 is electronically maintained at a cool temperature that substantially arrests the chemical reaction of the processing solution 904. The insulation shield 1128 substantially reduces the heat transfer to the cooling roller 1126. The processing station 922b may comprise any other suitable system and device for chilling the developing film 300.

Figure 12:
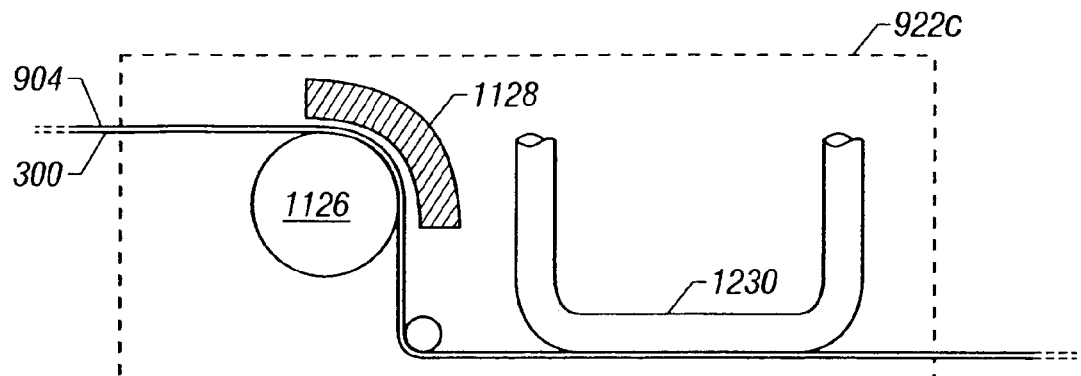

FIG. 12 illustrates a processing station 922c that operates to dry the processing solution 904 on the coated film 300. Drying the processing solution 904 substantially stops further development of the film 300 and may also decrease the opacity of the film 300. In the embodiment illustrated, the processing station 922c comprises an optional cooling roller 1126, as described in FIG. 11, and a drying system 1230. Although heating the coated film 300 would facilitate drying the processing solution 904, the higher temperature would also have the effect of accelerating the chemical reaction of the processing solution 904 and film 300. Accordingly, in the preferred embodiment, the film 300 is cooled to retard the chemical action of the processing solution 904 and then dried to effectively freeze-dry the coated film 300. Although chilling the film 300 is preferred, heating the film 300 to dry the film 300 can also be accomplished by incorporating the accelerated action of the developer solution 904 into the development time for the film 300. In another embodiment in which a suitable processing solution 1024 is applied to the film 300, the chemical action of the processing solution 904 is already minimized and the film 300 can be dried using heat without substantially effecting the development of the film 300. As illustrated, the drying system 1230 circulates air over the film 300 to dry the processing solution 904 and depending upon the embodiment, the processing solution 1024. The processing station 922c may comprise any other suitable system for drying the film 300.

Figure 13:
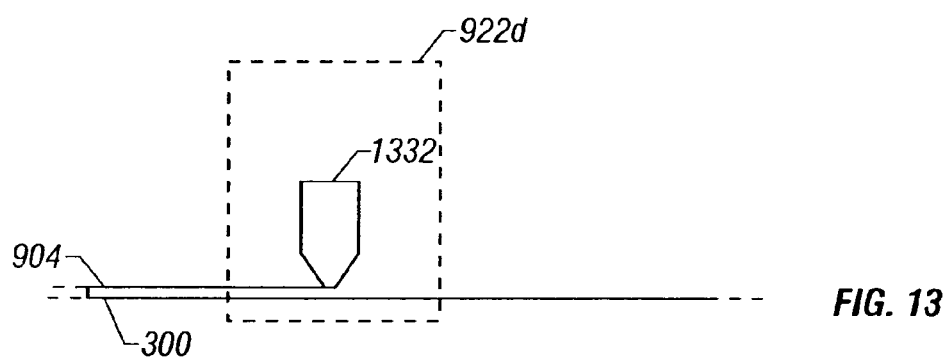

FIG. 13 illustrates a processing station 922d that operates to substantially remove excess processing solution 904, and any excess processing solution 1024, from the film 300. The processing station 922d does not remove the solutions 904, 1024 that are absorbed into the film 300. In other words, even after the wiping action, the film 300 includes some processing solutions 904, 1024. Removing any excess processing solution 904 will retard the continued development of the film 300. In addition, wiping any excess processing solutions 904, 1024 from the film 300 may improve the light reflectance and transmissivity properties of the coated film 300. In particular, removal of the excess processing solutions 904, 1024 may reduce any surface irregularities in the coating surface, which can degrade the scanning operation. In the embodiment illustrated, the processing station 922d comprises a wiper 1332 operable to substantially remove excess processing solution 904 and any processing solution 1024. In a particular embodiment, the wiper 1332 includes an absorbent material that wicks away the excess processing solutions 904, 1024. In another embodiment, the wiper 1332 comprises a squeegee that mechanically removes substantially all the excess processing solutions 904, 1024. The processing station 922d may comprise any suitable device or system operable to substantially remove any excess processing solutions 904, 1024.

Although specific embodiments of the processing station 922 have been described above, the processing station 922 may comprise any suitable device or system for further processing the film 300. In particular, the processing station 922 may comprise any suitable combination of the above embodiments. For example, the processing station 922 may comprise an applicator station 900b for applying a processing solution 1024, a cooling roller 1126, and a drying system 1230. As another example, the processing station 922 may comprise a wiper 1332 and a drying system 1230.

Figure 14:
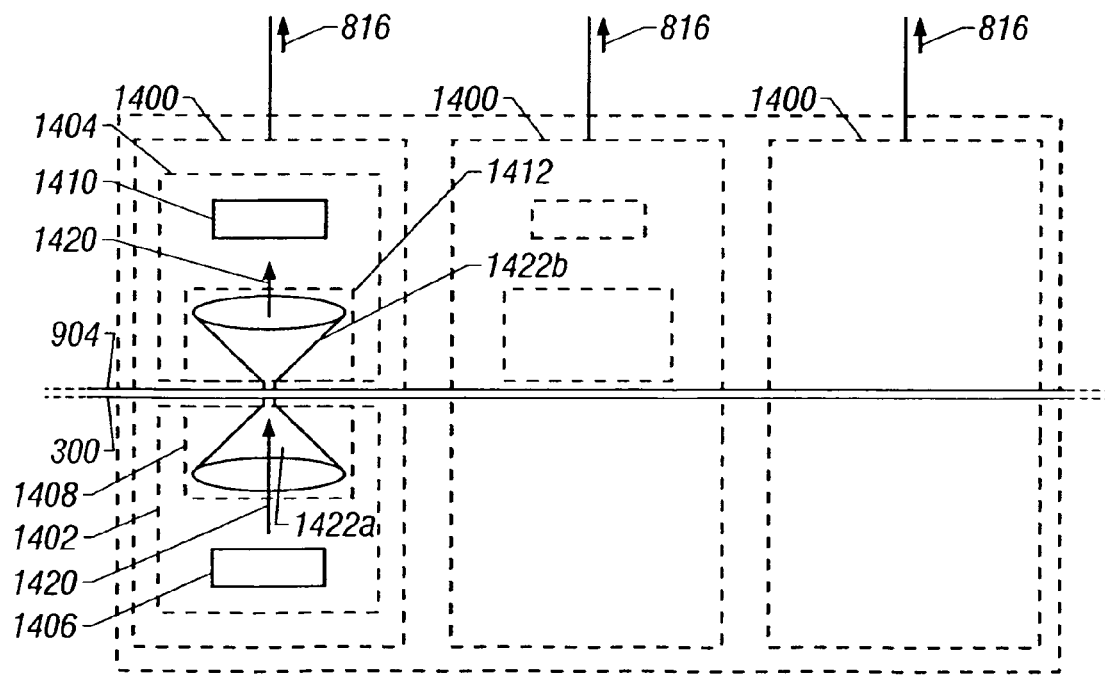
FIG. 14 is a block diagram illustrating a scanning system, as shown in FIG. 8, according to at least one embodiment of the present invention.

FIG. 14 is a diagram of the scanning system 824. Scanning system 824 comprises one or more scanning stations 1400. Individual scanning stations 1400 may have the same or different architectures and embodiments. Each scanning station 1400 comprises a lighting system 1402 and a sensor system 1404. The lighting system 1402 includes one or more light sources 1406 and optional optics 1408. The sensor system 1404 includes one or more detectors 1410 and optional optics 1412. In operation, the lighting system 1402 operates to produce suitable light 1420 that is directed onto the film 300. The sensor system 1404 operates to measure the light 1420 from the film 300 and produce sensor data 816 that is communicated to the to the data processing system 802.

Each scanning station 1400 utilizes electromagnetic radiation, i.e., light, to scan the film 300. Individual scanning stations 1400 may have different architectures and scan the film 300 using different colors, or frequency bands (wavelengths), and color combinations. In particular, different colors of light interact differently with the film 300. Visible light interacts with the dye image and silver within the film 300. Whereas, infrared light interacts with the silver, but the dye image is generally transparent to infrared light. The term "color" is used to generally describe specific frequency bands of electromagnetic radiation, including visible and non-visible light.

Visible light, as used herein, means electromagnetic radiation having a wavelength or band generally within the electromagnetic spectrum of near infrared light (>700 nm) to near ultraviolet light (<400 nm). Visible light can be separated into specific bandwidths. For example, the color red is generally associated with light within a frequency band of approximately 600 nm to 700 nm, the color green is generally associated with light within a frequency band of approximately 500 nm to 600 nm, and the color blue is generally associated with light having a wavelength of approximately 400 nm to 500 nm. Near infrared light is generally associated with radiation having a wavelength of approximately 700 nm to 1500 nm. Although specific colors and wavelengths are described herein, the scanning station 1400 may utilize other suitable colors and wavelengths (frequency) ranges without departing from the spirit and scope of the invention.

The light source 1406 may comprise one or more devices or a system that produces suitable light 1420. In the preferred embodiment, the light source 1406 comprises an array of light-emitting diodes (LEDs). In this embodiment, different LEDs within the array may be used to produce different colors of light 1420, including infrared light. In particular, specific colors of LEDs can be controlled to produce short duration pulses of light 1420. In another embodiment, the light source 1406 comprises a broad spectrum light source 1406, such as a fluorescent, incandescent, tungsten-halogen, direct gas discharge lamps, and the like. In this embodiment, the sensor system 1404 may include filters for spectrally separating the colors of light 1420 from the film 300. For example, as described below, a RGB filtered trilinear array of detectors may be used to spectrally separate the light 1420 from the film 300. In another embodiment of a broad-spectrum light source, the light source 1406 includes a filter, such as a color wheel, to produce the specified colors of light 1420. In yet another embodiment, the light source 1406 comprises a point light source, such as a laser. For example, the point light source may be a gallium arsenide or an indium gallium phosphide laser. In this embodiment, the width of the laser beam is preferably the same size as a pixel on the film 300 (~12 microns). Filters, such as a color wheel, or other suitable wavelength modifiers or limiters maybe used to provide the specified color or colors of light 1420.

Optional optics 1408 for the lighting system 1402 directs the light 1420 to the film 300. In the preferred embodiment, the optics 1408 comprises a waveguide that directs the light 1420 onto the film 300. In other embodiment, the optics 1420 includes a lens system for focusing the light 1420. In a particular embodiment, the lens system includes a polarizing filter to condition the light 1420. The optics 1408 may also include a light baffle 1422*a*. The light baffle 1422*a* constrains illumination of the light 1420 within a scan area in order to reduce light leakage that could cause fogging of the film 300. In one embodiment, the light baffle 1422*a* comprises a coated member adjacent the film 300. The coating is generally a light absorbing material to prevent reflecting light 1420 that could cause fogging of the film 300.

The detector 1410 comprises one or more photodetectors that convert light 1420 from the film 300 into data signals 816. In the preferred embodiment, the detector 1410 comprises a linear charge coupled device (CCD) array. In another embodiment, the detector 1410 comprises an area array. The detector 1410 may also comprise a photodiode, phototransistor, photoresistor, and the like. In addition, the detector 1410 may utilize time delay integration (TDI) to improve the accuracy detector 1410. The detector 1410 may include filters to limit the bandwidth, or color, detected by individual photodetectors. For example, a trilinear array often includes separate lines of photodetectors with each line of photodetectors having a color filter to allow only one color of light to be measured by the photodetector. Specifically, in a trilinear array, the array generally includes individual red, green, and blue filters over separate lines in the array. This allows the simultaneous measurement of red, green, and blue components of the light 1420. Other suitable types of filters may be used. For example, a hot mirror and a cold mirror can be used to separate infrared light from visible light.

Optional optics 1412 for the sensor system 1404 directs the light 1420 from the film 300 onto the detector 1410. In the preferred embodiment, the optics 1412 comprises a lens system that directs the light 1420 from the film 300 onto the detector 1410. In a particular embodiment, the optics 1412 include polarized lenses. The optics 1412 may also include a light baffle 1422*b*. The light baffle 1422*b* is similar in function to light baffle 1422*a* to help prevent fogging of the film 300.

As discussed previously, individual scanning stations 1400 may have different architectures. For example, light 1420 sensed by the sensor system 1404 may be transmitted light or reflected light. Light 1420 reflected from the film 300 is generally representative of the emulsion layer on the same side of the film 300 as the sensor system 1404. Specifically, light 1420 reflected from the front side (emulsion side) of the film 300 represents the blue sensitive layer and light 1420 reflected from the back side of the film 300 represents the red sensitive layer. Light 1420 transmitted through the film 300 collects information from all layers of the film 300. Different colors of light 1420 are used to measure different characteristics of the film 300. For example, visible light interacts with the dye image and silver within the film 300, and infrared light interacts with the silver in the film 300.

Different architectures and embodiments of the scanning station 1400 may scan the film 300 differently. In particular, the lighting system 1402 and sensor system 1404 operate in concert to illuminate and sense the light 1420 from the film 300 to produce suitable sensor data 816. In one embodiment, the lighting system 1402 separately applies distinct colors of light 1420 to the film 300. In this embodiment, the sensor system 1404 generally comprises a non-filtered detector 1410 that measures in series the corresponding colors of light 1420 from the film 300. In another embodiment, multiple unique color combinations are simultaneously applied to the film 300, and individual color records are derived from the sensor data 816. In another embodiment, the lighting system 1402 simultaneously applies multiple colors of light 1420 to the film 300. In this embodiment, the sensor system 1404 generally comprises a filtered detector 1410 that allows the simultaneous measurement of individual colors of light 1420. Other suitable scanning methods may be used to obtain the required color records.

The use of the processing station 922 may improve the scanning properties of the film 300 in addition to retarding or substantially stopping the continued development of the film 300. For example, the amount of light 1420 transmitted through the film 300 is negatively effected by the opacity of the film 300. In other words, the greater the opacity of the film 300 the lower the amount of light 1420 transmitted through the film 300. Both the silver image and silver halide within the film 300 occlude light 1420. On the whole, the silver image within the film 300 absorbs light 1420, and the silver halide reflects light 1420. As described above, the processing solutions 1024 may be used to modify opacity of the film 300 and improve the scanning properties of the film 300.

Specific examples of scanner station 1400 architectures are illustrated in FIGS. 15–18. The scanning system 824 may comprise any illustrated example, combination of examples, or other suitable methods or systems for scanning the film 300 without departing from the scope and spirit of the invention.

Figure 15:
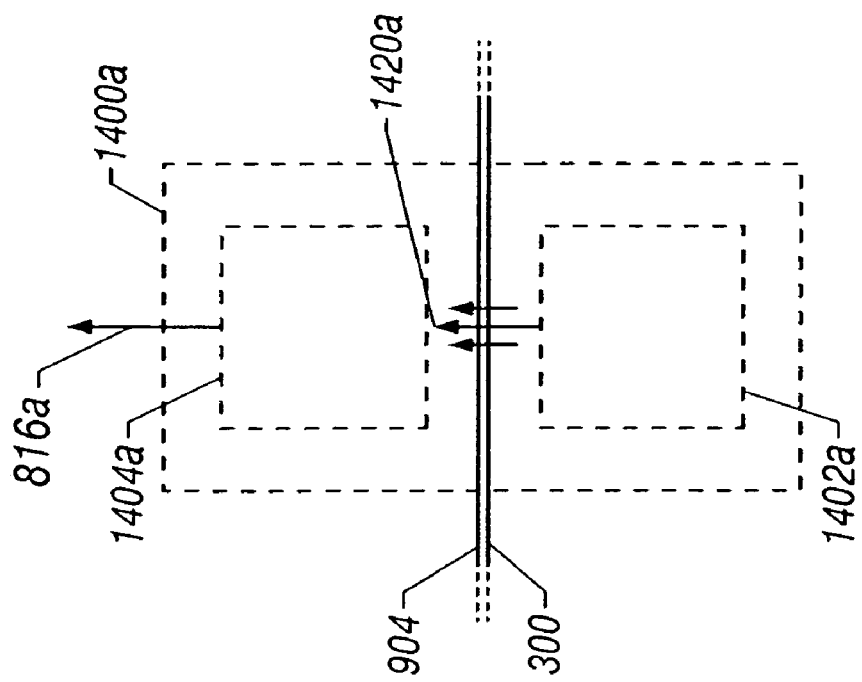

FIG. 15 is a schematic diagram illustrating a scanning station 1400*a* having a transmission architecture. As illustrated, the transmission scanning station 1400*a* comprises a lighting system 1402*a* and a sensor system 1404*a*. Lighting system 1402*a* produces light 1420*a* that is transmitted through the film 300 and measured by the sensor system 1404*a*. The sensor system 1404*a* produces sensor data 816*a* that is communicated to the data processing system 802.

Lighting system 1402*a* and sensor system 1404*a* are similar in design and function as lighting system 1402 and sensor system 1404, respectively. The visible light 1420*a* may comprise broadband visible light, individual visible light colors, or combinations of visible light colors. In an embodiment in which the light 1420*a* comprises broadband visible light, the sensor system 1404*a* will preferably comprise a red, green and blue tri-linear array. In this embodiment, the sensor system 1404*a* can simultaneously measure the red, green and blue components of light 1420*a* from the film 300. In another embodiment, the light 1420*a* comprises pulses of red, green and blue light, and the sensor system 1404*a* preferably comprises an unfiltered detector operable to measure the pulses of light 1420*a* from the film 300. In this embodiment, the color of the light 1420*a* changes and the sensor system 1404*a* measures the respective light pulses from the film 300.

In one embodiment of the scanning station 1400*a*, the light 1420*a* produced by the lighting system 1402*a* comprises visible light. The visible light 1420*a* interacts with at least one dye cloud within the film 300 and any silver occlusions contained in the film 300. In particular, depending upon the embodiment of the development system 822, the film 300 may include silver forming an optical occlusion, such as metallic silver grains, silver halide, or both, but does not include silver compounds formed as a result of fixing the silver halide contained within the film 300.

The visible light 1420*a* interacts with the magenta, cyan and yellow dye images within the film 300, as well as any silver occlusions within the film 300, the sensor system 1404*a* records the intensity of visible light 1420*a* from the film 300 and produces sensor data 816*a*. The sensor data 816*a* generally comprises a red, green, and blue record corresponding to the cyan, magenta, and yellow dye images, respectively. Depending upon the development process, each of the red, green, and blue records may include a silver record. Specifically, any metallic silver grains or silver halide within the film 300 partially occludes the visible light 1420*a* transmitted through the film 300. Depending upon the severity of the occlusions, the red, green, and blue records are processed by the data processing system 802 to correct for the occlusion in the film 300.

In the preferred embodiment of the transmission scanning station 1400*a*, the light 1420*a* produced by the lighting system 1402*a* comprises visible light and infrared light. As discussed above, the visible light may comprise broadband visible light, individual visible light colors, or combinations of visible light colors. The infrared light may comprise infrared, near infrared, or any suitable combination thereof.

The visible light 1420*a* interacts with the dye images, i.e. cyan, magenta, or yellow, within the film 300 and any silver to produce a red, green, and/or blue record that includes a silver record. The infrared light interacts with the silver, and any other occlusions, within the film 300 and produces a silver record. The silver record can then be used to remove, at least in part, the effects of the occlusions contained in the red, green, and blue records. This embodiment is analogous to the defect correction electronic scanners described in U.S. Pat. No. 5,266,805, entitled *System and Method for Image Recovery*, which is hereby incorporated herein by reference. In this embodiment, any occlusions within the film are analogous to defects that obstruct the optical path of the infrared light. The degree of occlusion is used as a basis for modifying the color records. For example, in pixels having a high occlusion density, the individual color records are significantly increased, whereas in pixels having a low occlusion density, the individual color records are relatively unchanged.

In yet another embodiment of the transmission scanning station 1400*a*, the light produced by the lighting system 1402*a* comprises only infrared and/or near infrared light. In this embodiment, the infrared light 1420*a* interacts with occlusions within the film 300 but does not substantially interact with the dye images within the film 300. In this embodiment, the sensor data 816*a* does not spectrally distinguish the magenta, cyan, and yellow dye images. An advantage of this embodiment is that the infrared light 1420*a* does not fog the film 300. In a particular embodiment, the advantage of not fogging the film 300 allows the film 300 to be scanned at multiple development times without significantly fogging the film 300. In this embodiment, the scanning station 1400*a* can be used to determine the optimal development time for the film 300. This embodiment may also be used to scan the silver image.

Figure 16:
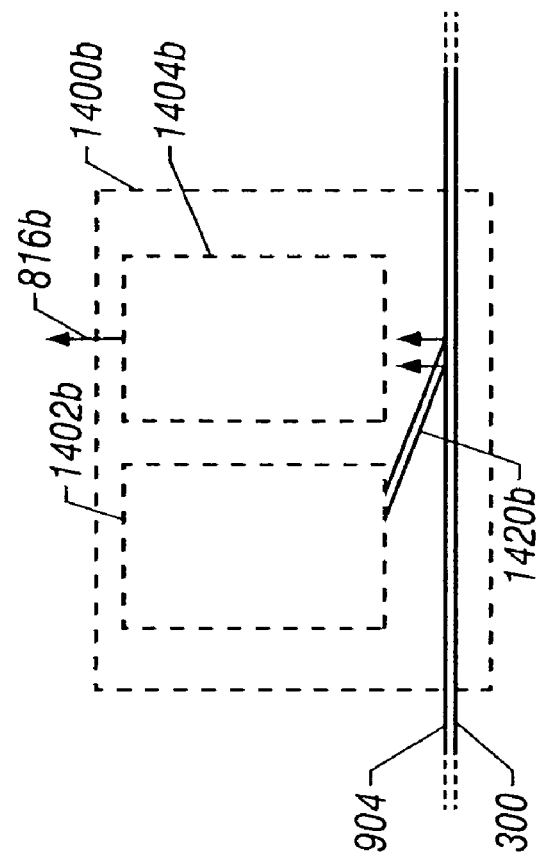
FIGS. 15 through 18 are block diagrams illustrating various embodiments of a scanning station, as shown in FIG. 14, according to at least one embodiment of the present invention.

FIG. 16 is a schematic diagram illustrating a scanning station 1400*b* having a reflection architecture. The reflective scanning station 1400*b* comprises a lighting system 1402*b* and a sensor system 1404*b*. Lighting system 1402*b* produces light 1420*b* that is reflected from the film 300 and measured by the sensor system 1404*b*. The scanning station 1400*b* generally requires silver halide to be present within the film 300. The silver halide scatters and reflects the light 1420*b* measured by the sensor system 1404*b*. The sensor system 1404*b* produces sensor data 816*b* that is communicated to the data processing system 802. Lighting system 1402*b* and sensor system 1404*b* are similar to lighting system 1402 and sensor system 1404, respectively.

In one embodiment of the reflective scanning station 1400*b* used to scan the blue emulsion layer of the film 300, the light 1420*b* produced by the lighting system 1402*b* comprises blue light. In this embodiment, the blue light 1420*b* scans the silver and dye image within the blue layer of the film 300. The blue light 1420*b* interacts with the yellow dye image and also the silver in the blue emulsion layer. In particular, the blue light 1420*b* is reflected from the silver halide and measured by the sensor system 1404*b* to produce a blue record. Many conventional films 300 include a yellow filter below the blue emulsion layer that blocks the blue light 1420*a* from illuminating the other emulsion layers of the film 300. As a result, noise created by cross-talk between the blue emulsion layer and the red and green emulsion layers is substantially reduced.

In another embodiment of the reflective scanning station 1400*b* used to scan the blue emulsion layer of the film 300, the light 1420*b* produced by the lighting system 1402*b* comprises non-blue light. It has been determined that visible light other than blue light interacts in substantially the same manner with the various emulsion layers. In this embodiment, infrared light also interacts in substantially the same manner as non-blue light, with the exception that infrared light will not fog the emulsion layers of the film 300. In this embodiment, the non-blue light 1420*b* interacts with the silver image in the blue emulsion layer of the film 300, but is transparent to the yellow dye within the blue emulsion layer of the film 300. This embodiment is prone to higher noise levels created by cross-talk between the blue and green emulsion layers of the film 300.

In yet another embodiment of the reflective scanning station 1400*b*, the light 1420*b* produced by the lighting system 1402*b* comprises visible and infrared light. In this embodiment, blue light interacts with the yellow dye image and the silver image in the blue emulsion layer, green light interacts with magenta dye image and the silver in each of the emulsion layers, red light interacts with the cyan dye image and the silver in each of the emulsion layers, and the infrared light interacts with the silver in each emulsion layer of the film 300. In this embodiment, the sensor system 1404*b* generally comprises a filtered detector 1410*b* (not expressly shown) that measures the red, green, blue, and infrared light 1420*b* from the film 300 to produce red, green, blue, and infrared records as sensor data 816*b*.

Although the scanning station 1400*b* is illustrated with the lighting system 1402*b* and the sensor system 1404*b* located on front side of the film 300, the lighting system 1402*b* and the sensor system 1404*b* may also be located on the back side of the film 300. In this embodiment, the light 1420*b* produced by the lighting system 1402*b* may comprise red light. The red light largely interacts with the cyan dye image and silver in the red emulsion layer of the film 300 to produce a red record of the sensor data 816*b*.

Figure 17:
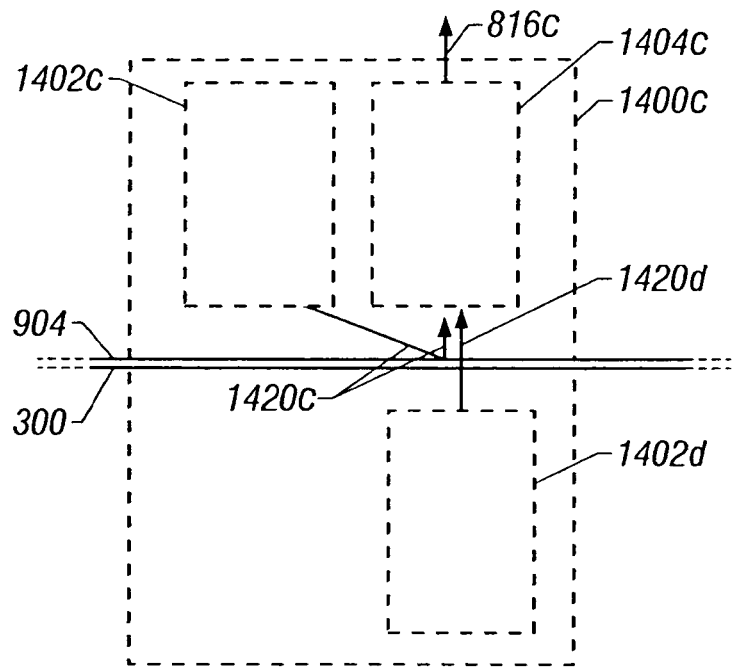

FIG. 17 is a schematic diagram illustrating a scanning station 1400*c* having a transmission-reflection architecture. The transmission-reflection architecture is the preferred embodiment of the scanning system 824. In this embodiment, the scanning station 1400*c* comprises a first lighting system 1402*c*, a second lighting system 1402*d*, and a sensor system 1404*c*. In the preferred embodiment, the lighting system 1402*c* operates to illuminate the front side of the film 300 with light 1420*c*, the second lighting system 1402*d* operates to illuminate the backside of the film 300 with light 1420*d*, and the sensor system 1404*c* operates to measure the light 1420*c* reflected from the film 300 and the light 1420*d* transmitted through the film 300. Based on the measurements of the light 1420*b*, 1420*d*, the sensor system 1404*c* produces sensor data 816*c* that is communicated to the data processing system 802. Lighting system 1402*c* and 1402*d* are similar to lighting system 1402, and sensor system 1404*c* is similar to the sensor system 1404. Although scanning station 1400*c* is illustrated with lighting systems 1402*c*, 1402*d*, a single light source may be used to produce light that is directed through a system of mirrors, shutters, filters, and the like, to illuminate the film 300 with the front side of the film 300 with light 1420*c* and illuminate the back side of the film 300 with light 1420*d*. The light 1420*c*, 1420*d* may comprise any color or color combinations, including infrared light.

This embodiment of the scanning station 1400*c* utilizes many of the positive characteristics of the transmission architecture scanning station 1400*a* and the reflection architecture scanning station 1400*b*. For example, the blue emulsion layer is viewed better by light 1420*c* reflected from the film 300 than by light 1420*d* transmitted through the film 300; the green emulsion layer is viewed better by light 1420*d* transmitted through the film 300 than by light 1420*c* reflected from the film 300; and the red emulsion layer is adequately viewed by light 1420*d* transmitted through the film 300. In addition, the cost of the scanning station 1400*c* is minimized through the use of a single sensor system 1404*c*.

In the preferred embodiment of the scanning station 1400*c*, the light 1420*c* comprises blue light, and light 1420*d* comprises red, green, and infrared light. The blue light 1420*c* interacts with the yellow dye image and silver in the blue emulsion layer of the film 300. The sensor system 1404*c* measures the light 1420*c* from the film 300 and produces a blue-silver record. The red and green light 1420*d* interacts with the cyan and magenta dye images, respectively, as well as the silver in the film 300. The infrared light 1420*d* interacts with the silver, but does not interact with the dye clouds within the film 300. As discussed previously, the silver contained within the film 300 may comprise silver grains, silver halide, or both. The red, green, and infrared light 1420*d* transmitted through the film 300 is measured by the sensor system 1404*c*, which produces a red-silver, green-silver, and silver record. The blue-silver, red-silver, green-silver, and silver records form the sensor data 816*c* that is communicated to the data processing system 802. The data processing system 802 utilizes the silver record to facilitate removal of the silver component from the red, green, and blue records.

In another embodiment, the light 1420*c* comprises blue light and infrared light, and light 1420*d* comprises red, green, and infrared light. As discussed previously, the blue light 1420*c* mainly interacts with the yellow dye image and silver within the blue emulsion layer of the film 300. The infrared light 1420*c* interacts with mainly the silver in the blue emulsion layer of the film 300. The sensor system 1404*c* measures the blue and infrared light 1420*c* from the film 300 and produces a blue-silver record and a front side silver record, respectively. The red, green, and infrared light 1420*d* interact with the film 300 and are measured by the sensor system 1404*c* to produce red-silver, green-silver and transmitted-silver records as discussed above. The blue-silver, red-silver, green-silver, and both silver records form the sensor data 816*c* that is communicated to the data processing system 802. In this embodiment, the data processing system 802 utilizes the front side silver record of the blue emulsion layer to facilitate removal of the silver component from the blue-silver record, and the transmission-silver record is utilized to facilitate removal of the silver component from the red and green records.

Although the scanning station 1400*c* is described in terms of specific colors and color combinations of light 1420*c* and light 1420*d*, the light 1420*c* and light 1420*d* may comprise other suitable colors and color combinations of light without departing from the scope of the invention. For example, light 1420*c* may comprise non-blue light, infrared light, broadband white light, or any other suitable light. Likewise, light 1420*d* may include blue light, broadband white light, or another other suitable light. Scanning station 1400*c* may also comprise other suitable embodiments without departing from the scope of the invention. For example, although the scanning station 1400*c* is illustrated with two lighting systems 1402 and a single sensor system 1404, the scanning station 1400*c* could be configured with a single lighting system 1402 and two sensor systems 1404, wherein one sensor system measures light 1420 reflected from the film 300 and the second sensory system 1404 measures light 1420 transmitted through the film 300. In addition, as discussed above, the scanning station 1400 may comprise a single lighting system that illuminates the film 300 with light 1420*c* and light 1420*d*.

Figure 18:
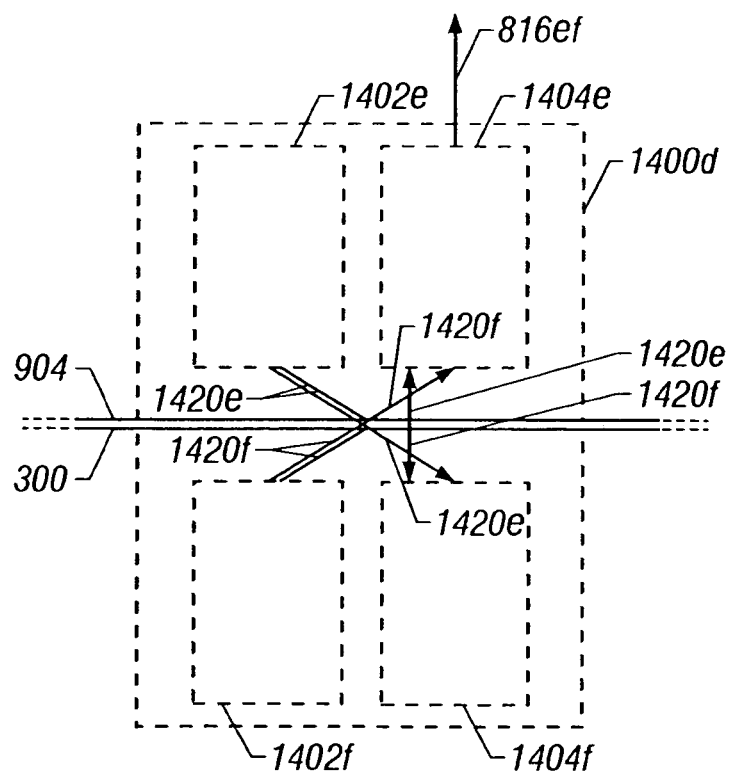

FIG. 18 is a schematic diagram illustrating a scanning station 1400*d* having a reflection-transmission-reflection architecture. In this embodiment, the scanning station 1400*d* comprises a first lighting system 1402*e*, a second lighting system 1402*f*, a first sensor system 1404*e*, and a second sensor system 1404*f*. In the embodiment illustrated, the lighting system 1402*e* operates to illuminate the front side of the film 300 with light 1420*e*, and the second lighting system 1402*f* operates to illuminate the back side of the film 300 with light 1420*f*. The first sensor system 1404*e* operates to measure the light 1420*e* reflected from the film 300 and the light 1420*f* transmitted through the film 300, and the second sensor system 1404*f* operates to measure the light 1420*f* reflected from the film 300 and the light 1420*e* transmitted through the film 300. Based on the measurements of the light 1420*e* and 1420*f*, the sensor systems 1404*e*, 1404*f* produce sensor data 816*ef* that is communicated to the data processing system 802. Lighting systems 1402*e*, 1402*f* are similar to lighting systems 1402, and sensor systems 1404*e*, 1404*f* are similar to the sensor system 1404. Although scanning station 1400*d* is illustrated with lighting systems 1402*e*, 1402*f*, and sensor systems 1404*e*, 1404*f*, a single lighting system and/or sensory system, respectively, may be used to produce light that is directed through a system of mirrors, shutters, filters, and the like, to illuminate the film 300 with the frontside of the film 300 with light 1420*e* and illuminate the backside of the film 300 with light 1420*f*.

This embodiment of the scanning station 1400*d* expands upon the positive characteristics of the transmission-reflection architecture of scanning station 1400*c*. For example, as discussed in reference to FIG. 17, the blue emulsion layer is viewed better by light 1420*e* reflected from the film 300 and the green emulsion layer is viewed better by light 1420*e* or 1420*f* transmitted through the film 300. Second sensor system 1404*f* allows viewing of the red emulsion layer by light 1420*f* reflected from the film 300, which generally produces better results than viewing the red emulsion layer by light 1420*e* or light 1420*f* transmitted through the film 300.

In one embodiment of the scanning station 1400*d*, the light 1420*e* and 1420*f* comprises light within the infrared portion of the electromagnetic spectrum. In this embodiment, the sensor system 1404*e* measures light 1420*e* reflected from the front emulsion layer and light 1420*f* transmitted through the film 300. The sensor system 1404*f* measures light 1420*f* reflected from the back emulsion layer and light 1420*e* transmitted through the film 300. In general, the front measurement corresponds to the blue signal, the back measurement corresponds to the red signal, and the through measurement minus the front and back measurement corresponds to the green signal. In this embodiment, cross-talk exists between the emulsion layers, as the emulsion layers are not spectrally unique using infrared light.

In the preferred embodiment of the scanning station 1400*d*, the sensor systems 1404*e*, 1404*f* include a trilinear array of filtered detectors, and the light 1420*e* and the light 1420*f* comprises broadband white light and infrared light. The trilinear array operates to simultaneously measure the individual red, green, and blue components of the broadband white light 1420*e*, 1420*f*. The infrared light is measured separately and can be measured through each filtered detector 1410 of the sensor systems 1404*e*, 1404*f*. The broadband white light 1420*e*, 1420*f* interacts with the silver and magenta, cyan, and yellow color dyes in the film 300, respectively, and the infrared light 1420*e*, 1420*f* interacts with the silver within the film 300. The reflected white light 1420*e* measured by the first sensor system 1404*e* includes information corresponding to the yellow dye image and the silver in the blue emulsion layer of the film 300. In particular, the blue component of the broadband white light 1420*e* measured by the blue detector of the sensor system 1404*e* corresponds to the yellow dye image, and the non-blue components of the broadband white light 1420*e* measured by the red and green detectors corresponds to the red and green dye images and all the silver within the emulsion layers of the film 300. Similarly, the red component of the broadband white light 1420*f* measured by the red detector of the sensor system 1404*f* corresponds largely to the cyan dye image, and the non-red components of the broadband white light 1420*e* measured by the blue and green detectors corresponds to the yellow and magenta dye images and all the silver within the emulsion layers of the film 300. The white light 1420*e*, 1420*f* transmitted through the film 300 interacts with each color dye image and silver within the film 300, and the red, green, and blue light components are measured by the red, green, and blue detectors of the sensor systems 1404*e*, 1404*f* to produce individual red, green and blue light records that include the silver record. The infrared light 1420*e* reflected from the film 300 and measured by the sensor system 1404*e* corresponds largely to the silver in the blue emulsion layer of the film 300, and the infrared light 1420*f* reflected from the film 300 and measured by the sensor system 1404*f* largely corresponds to the silver in the red emulsion layer of the film 300. The infrared light 1420*e*, 1420*f* transmitted through the film 300 measured by the sensor systems 1404*e*, 1404*f* corresponds to the silver in the red, green, and blue emulsion layers of the film 300. The individual measurements of the sensor systems 1404*e*, 1404*f* are communicated to the data processing system 802 as sensor data 816*ef*. The data processing system 802 processes the sensor data 816*ef* and constructs the digital image 808 using the various sensor system measurements. For example, the blue signal value for each pixel can be calculated using the blue detector data from the reflected light 1420*e* and the blue detector data from the transmitted light 1420*f*, as modified by non-blue detector data from the reflected light 1420*e*, and the non-blue detector data from the transmitted light 1420*e* or 1420*f*. The red and green signal values for each pixel can be similarly calculated using the various measurements.

In another embodiment of the scanning station 1400*d*, the sensor systems 1404*e*, 1404*f* include a trilinear array of filtered detectors, and the light 1420*e* and the light 1420*f* comprises broadband white light. This embodiment of the scanning station 1400*d* operates in a similar manner as discussed above, with the exception that infrared light is not measured or used to calculate the digital image 808.

Although the scanning station 1400*d* is described in terms of a specific colors and color combinations of light 1420*e* and light 1420*f*, the light 1420*e* and light 1420*f* may comprise other suitable colors and color combinations of light without departing from the scope of the invention. Likewise, the scanning station 1400*d* may comprise other suitable devices and systems without departing from the scope of the invention.

In the previous detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. The previous detailed description is, therefore, not to be taken in a limiting sense, and the scope of the present invention is defined only by the appended claims.

What is claimed is:

1. A method comprising:
obtaining a first set of information representing an artifact of an original signal to a first degree of quality;
obtaining a second set of information representing the artifact of the original signal to a second degree of quality different from the first degree of quality;
determining which of the first set of information and the second set of information represents the artifact of the original signal to a higher degree of quality and which represents the artifact of the original signal to a lesser degree of quality; and
altering the set of information representing the artifact of the original signal to a lesser degree of quality, based on the set of information representing the artifact of the original signal to a higher degree of quality, to enhance quality of the original signal.

2. The method as in claim 1, wherein said altering includes performing a Fourier transform analysis on the first set of information and the second set of information.

3. The method as in claim 2, wherein said altering further includes using a phase of the set of information representing the artifact to a higher degree of quality to adjust a phase of the set of information representing the artifact to lesser degree of quality.

4. The method as in claim 2, wherein said altering further includes using a magnitude of the set of information representing the artifact to a higher degree of quality to adjust a magnitude of the set of information representing the artifact to lesser degree of quality.

5. The method as in claim 1, wherein the first set of information and the second set of information are a digital representation of an analog image.

6. The method as in claim 1, wherein the first set of information and the second set of information are obtained using a scanner.

7. The method as in claim 1, wherein the first set of information and the second set of information are obtained using a digital camera.

8. The method as in claim 1, wherein the first set of information and the second set of information are obtained using a digital film development system.

9. The method as in claim 1, wherein the first set of information and the second set of information are a digital representation of an analog image.

10. The method as in claim 1, wherein the first set of information and the second set of information are a digital representation of an analog image.

11. The method as in claim 1, wherein the first set of information and the second set of information are obtained using a digital film development system.

12. A digital film development system comprising:
a film processing system, said film processing system including an image capturing station capable of obtaining sets of data representing a single image formed in film; and
a data processing system, said data processing system including:
a processor;
memory operably coupled to said processor; and
a program of instructions capable of being stored in said memory and executed by said processor, said program of instructions including instructions for:
obtaining a first set of information representing an artifact of the single image to a first degree of quality;
obtaining a second set of information representing the artifact of the single image to a second degree of quality different from the first degree of quality;
determining which of the first set of information and the second set of information represents the artifact of the single image to a higher degree of quality and which represents the artifact of the single image to a lesser degree of quality; and
altering the set of information representing the artifact of the single image to a lesser degree of quality, based on the set of information representing the artifact of the single image to a higher degree of quality, to enhance quality of the single image.

13. The digital film development system as in claim 12, wherein said program of instructions includes instructions for performing a Fourier transform analysis on the first set of information and the second set of information.

14. The digital film development system as in claim 13, wherein said program of instructions includes instructions for using a phase of the set of information representing the artifact to a higher degree of quality to adjust a phase of the set of information representing the artifact to lesser degree of quality.

15. The digital film development system as in claim 13, wherein said program of instructions includes instructions for using a magnitude of the set of information representing the artifact to a higher degree of quality to adjust a magnitude of the set of information representing the artifact to lesser degree of quality.

16. A digital image tangibly embodied in a computer readable medium, said digital image generated from a single original image of a subject according to a method comprising:
obtaining a first set of information representing an artifact of the original image to a first degree of quality;
obtaining a second set of information representing the artifact of the original image to a second degree of quality different from the first degree of quality;
determining which of the first set of information and the second set of information represents the artifact of the original image to a higher degree of quality and which represents the artifact of the original image to a lesser degree of quality; and
altering the set of information representing the artifact of the original image to a lesser degree of quality, based on the set of information representing the artifact of the original image to a higher degree of quality, to enhance quality of the original image in order to generate said digital image.

17. The digital image as in claim 16, wherein said altering includes performing a Fourier transform analysis on the first set of information and the second set of information.

18. The digital image as in claim 17, wherein said altering further includes using a phase of the set of information representing the artifact to a higher degree of quality to adjust a phase of the set of information representing the artifact to lesser degree of quality.

19. The digital image as in claim 17, wherein said altering further includes using a magnitude of the set of information representing the artifact to a higher degree of quality to adjust a magnitude of the set of information representing the artifact to lesser degree of quality.

20. The digital image as in claim 16, wherein the first set of information and the second set of information are obtained using a scanner.

21. The digital image as in claim 16, wherein the first set of information and the second set of information are obtained using a digital camera.

22. The digital image as in claim 16, wherein the first set of information and the second set of information are obtained using a digital film processing system.

23. A method comprising:
   illuminating an image;
   recording one digital representation of the image;
   selecting, from the one digital representation, a first set of information representing a portion of the image;
   selecting, from the one digital representation, a second set of information representing the portion of the image, the second set of information being different from the first set of information;
   generating, from one of the first set of information and the second set of information, a shepherd artifact representing an image artifact with a higher degree of quality;
   generating, from the other of the first set of information and the second set of information, a sheep artifact representing the image artifact with a lesser degree of quality; and
   altering the sheep artifact using the shepherd artifact to improve the degree of quality with which the sheep artifact represents the image artifact.

24. The method as in claim 23, wherein said altering includes performing a Fourier transform analysis on the first set of information and the second set of information.

25. The method as in claim 24, wherein said altering further includes using a phase of the set of information representing the artifact to a higher degree of quality to adjust a phase of the set of information representing the artifact to lesser degree of quality.

26. The method as in claim 25, wherein said altering further includes using a magnitude of the set of information representing the artifact to a higher degree of quality to adjust a magnitude of the set of information representing the artifact to lesser degree of quality.

27. The method as in claim 23, wherein the first set of information and the second set of information are obtained using a scanner.

28. A method of enhancing an original signal, comprising:
   obtaining two sets of data from the original signal, one set being a plurality of shepard artifacts having relatively more information associated with a selected property of the original signal, and another set being a plurality of sheep artifacts having relatively less information associated with the selected property of the original signal;
   selecting a representative shepard artifact from the plurality of shepard artifacts, and selecting a representative sheep artifact from the plurality of sheep artifacts; and
   using the selected representative shepard artifact as a guide to alter the selected representative sheep artifact to enhance the original signal.

29. A method comprising:
   obtaining a first set of information representing an artifact to a first degree of quality;
   obtaining a second set of information representing the artifact to a second degree of quality different from the first degree of quality;
   determining which of the first set of information and the second set of information represents the artifact to a higher degree of quality and which represents the artifact to a lesser degree of quality; and
   altering only the set of information representing the artifact to a lesser degree of quality, based on the set of information representing the artifact to a higher degree of quality, to provide enhanced quality.

30. A digital image tangibly embodied in a computer readable medium, said digital image generated according to a method comprising:
   obtaining a first set of information representing an artifact to a first degree of quality;
   obtaining a second set of information representing the artifact to a second degree of quality different from the first degree of quality;
   determining which of the first set of information and the second set of information represents the artifact to a higher degree of quality and which represents the artifact to a lesser degree of quality; and
   altering only the set of information representing the artifact to a lesser degree of quality, based on the set of information representing the artifact to a higher degree of quality, to provide enhanced quality of said digital image.

* * * * *